(12) United States Patent

Ohsawa et al.

(10) Patent No.: US 7,082,601 B2
(45) Date of Patent: Jul. 25, 2006

(54) MULTI-THREAD EXECUTION METHOD AND PARALLEL PROCESSOR SYSTEM

(75) Inventors: Taku Ohsawa, Tokyo (JP); Atsufumi Shibayama, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 680 days.

(21) Appl. No.: 10/196,613

(22) Filed: Jul. 17, 2002

(65) Prior Publication Data

US 2003/0018684 A1 Jan. 23, 2003

(30) Foreign Application Priority Data

Jul. 18, 2001 (JP) .............................. 2001-218158

(51) Int. Cl.
*G06F 9/45* (2006.01)
(52) U.S. Cl. ...................................... 717/149; 717/161
(58) Field of Classification Search ................ 717/149, 717/148, 153, 162, 143, 124, 126, 157; 712/228, 712/238, 15, 216; 711/118, 137, 206; 718/102, 718/103; 709/201; 714/38
See application file for complete search history.

(56) References Cited

U.S. PATENT DOCUMENTS

| 5,546,593 | A | * | 8/1996 | Kimura et al. ............... 712/228 |
| 5,890,008 | A | * | 3/1999 | Panwar et al. ................ 712/15 |
| 5,913,059 | A | | 6/1999 | Torii |
| 5,970,250 | A | * | 10/1999 | England et al. ............. 717/143 |
| 6,003,066 | A | * | 12/1999 | Ryan et al. .................. 709/201 |
| 6,035,374 | A | * | 3/2000 | Panwar et al. ............... 711/118 |
| 6,389,446 | B1 | | 5/2002 | Torii |
| 6,694,425 | B1 | * | 2/2004 | Eickemeyer ................ 712/216 |
| 6,697,935 | B1 | * | 2/2004 | Borkenhagen et al. ...... 712/228 |

FOREIGN PATENT DOCUMENTS

| EP | 0 330 836 A2 | 9/1989 |
| JP | 10-27108 | 1/1998 |
| JP | 10-78880 | 3/1998 |
| WO | WO 1998/043192 A2 | 10/1998 |

OTHER PUBLICATIONS

S. Torii et al. "Control Parallel On-Chip Multi-processor: MUSCAT," Proceedings of the Parallel Processing Symposium JSPP97 (May 1997), pp. 229-236, Japanese Society of Information Processing Engineers of Japan.

(Continued)

*Primary Examiner*—Wei Zhen
*Assistant Examiner*—Anna Deng
(74) *Attorney, Agent, or Firm*—Foley & Lardner LLP

(57) ABSTRACT

In a parallel processor system for executing a plurality of threads in parallel to each other by a plurality of thread execution units, the respective thread execution units allow for forking of a slave thread from an individual thread execution unit into another arbitrary thread execution unit. The respective thread execution units are managed in three states, a free state where fork is possible, a busy state where a thread is being executed, and a term state where a thread being terminated and yet to be settled exists. At the time of forking of a new thread, when there exists no thread execution unit at the free state, a thread that the thread execution unit at the term state has is merged into its immediately succeeding slave thread to bring the thread execution unit in question to the free state and conduct forking of a new thread.

16 Claims, 16 Drawing Sheets

OTHER PUBLICATIONS

R. Kobayashi et al., "SKY: A Processor Architecture that Exploits Instruction-level Parallelism in Non-numerical Applications," Proceedings of the Parallel Processing Symposium JSPP98 (Jun. 1998), pp. 87-94, Japanese Society of Information Processing Engineers of Japan.

G. S. Sohi et al., "Multiscalar Processors," 22$^{nd}$ International Symposium on Computer Architecture (Jun. 1995) pp. 414-425, IEEE Computer Society Press, Santa Margherita Ligure, Italy.

S. Gopal et al., "Speculative Versioning Cache," Proceedings of the 4$^{th}$ International Symposium on High Performance Computer Architecture (Feb. 1998) IEEE Computer Society Technical Committee, Las Vegas, Nevada.

* cited by examiner

MULTI-THREAD EXECUTION METHOD AND PARALLEL PROCESSOR SYSTEM

BACKGROUND OF THE INVENTION

1. Field of the Invention

The present invention relates to a parallel processor system for executing a plurality of threads which are obtained by dividing a single program in parallel to each other by a plurality of processors, and more particularly, to a parallel processor system enabling forking to a processor having a thread being terminated and yet to be settled.

2. Description of the Related Art

Among methods of processing a single program in parallel by a parallel processor system is a multi-thread execution method of executing instruction streams called threads obtained by dividing a program in parallel to each other by a plurality of processors. Literatures reciting this method are, for example, Japanese Patent Laying-Open No. 10-27108 (hereinafter referred to as Literature 1), "Proposal of On Chip Multiprocessor Oriented Control Parallel Architecture MUSCAT" (Proceedings of the Parallel Processing Symposium JSPP97, Japanese Society of Information Processing Engineers of Japan, pp. 229–236, May 1997) (hereinafter referred to as Literature 2), Japanese Patent Laying-Open No. 10-78880 (hereinafter referred to as Literature 3), "Processor Architecture SKY Using Interthread Instruction Level Parallelism of Non-numeric Calculation Program" (Proceedings of the Parallel Processing Symposium JSPP98, Japanese Society of Information Processing Engineers of Japan, pp. 87–94, June 1998) (hereinafter referred to as Literature 4), and "Multiscalar Processor" (G. S. Sohi, S. E. Breach and T. N. Vijaykumar, the 22nd International Symposium on Computer Architecture, IEEE Computer Society Press, 1995, pp. 414–425) (hereinafter referred to as Literature 5). In the following, the conventional techniques recited in the Literatures will be described.

In general, generating a new thread on other processor in a multi-thread execution method is called "forking a thread" and a thread on the side which conducts forking operation is called a master thread, a newly generated thread is called a slave thread, a point where a thread is forked is called a fork point and a head portion of a slave thread is called a fork destination address or a start point of the slave thread. In the Literatures 1 to 4, a fork instruction is inserted at a fork point in order to give an instruction to conduct thread forking. The fork instruction has designation of a fork destination address, so that execution of the fork instruction generates a slave thread starting at the fork destination address on other processor to start execution of the slave thread. In addition, an instruction called a term instruction for terminating processing of a thread is prepared, so that each processor terminates processing of a thread by the execution of the term instruction.

FIG. 15 shows outlines of processing of a multi-thread execution method. FIG. 15(a) shows a single program divided into three threads A, B and C. In a case of processing of the program by a single processor, one processor PE sequentially processes the threads A, B and C as shown in FIG. 15(b). On the other hand, as shown in FIG. 15(c), in the multi-thread execution methods recited in the Literatures 1 to 5, one processor PE1 executes the thread A and while the processor PE1 executes the thread A, the thread B is generated in other processor PE2 by a fork instruction buried in the thread A, so that the thread B is executed in the processor PE2. The processor PE2 also generates the thread C in a processor PE3 according to a fork instruction buried in the thread B. The processors PE1 and PE2 terminate processing of the threads according to term instructions buried immediately before the start points of the threads B and C, respectively, and after executing the last instruction of the thread C, the processor PE3 executes the subsequent instruction (system call instruction in general). By thus simultaneously executing the threads in parallel to each other by a plurality of processors, higher performance can be obtained than that of sequential processing.

As another conventional multi-thread execution method, there exists a multi-thread execution method of generating the thread B in the processor PE2 and the thread C in the processor PE3, respectively, by conducting a plurality of times of forking from the processor PE1 which executes the thread A as shown in FIG. 15(d). In contrast to the model shown in FIG. 15(d), the multi-thread execution method on which such a constraint is imposed as shown in FIG. 15(c) that a thread is allowed to generate a valid slave thread only once during its existence is called as a Fork-Once Parallel Execution model. The present invention is premised on such Fork-Once Parallel Execution model. The Fork-Once Parallel Execution model enables thread management to be drastically simplified and realizes a thread management unit as hardware on a practical hardware scale. Moreover, an individual processor exclusively has one other processor that generates a slave thread. In the Literatures 1 to 4, therefore, multi-thread execution is realized using a parallel processor system in which adjacent processors are connected in a ring in a single direction.

In a conventional parallel processor system, an individual processor is managed in two kinds of states, a free state and a busy state. Free state is a state where processor resources are released to be ready for starting execution of a new thread at any time. In a parallel processor system in which processors are connected to each other in a ring in a single direction, when a fork request is made by a certain processor, only if its adjacent processor is at the free state, forking of a slave thread is conducted. When a processor at the free state starts execution of a thread, it transits to the busy state and when the execution of the thread is completed to obtain a stop permission at a thread management unit, it returns to the free state. The reason why obtaining a stop permission at the thread management unit is assumed to be a condition of returning to the free state is that with such a constraint imposed that at the parallel execution of a plurality of threads having a sequential execution order relationship, a slave thread is not allowed to stop unless a master thread stops, the thread management unit for controlling thread generation and stop ensures the constraint.

When slave thread forking is made, register takeover from a master thread to a slave thread is necessary. The register takeover is conducted in two manners in general. One, as adopted in the parallel processor systems recited in the Literatures 1 to 3, is taking over only the contents of a register file of a master thread as of the forking and not the contents of a register updated after forking. The other, as adopted in the parallel processor systems recited in the Literatures 4 and 5, is taking over registers updated after forking as well. The former is called as a fork-time register-values transfer method, and the latter is called as an after-fork register-values transfer method.

Although a multi-thread execution method is premised on that preceding threads whose execution is settled are executed in parallel, actual programs in many cases fail to obtain sufficient threads whose execution is settled. In addition, there is a possibility that desired performance could not be obtained because a rate of parallelization is suppressed to be low due to such limitations as dynamically determined dependence, compiler analysis capability and the like. Therefore, the thread parallel processing adopts thread-basis non-program order execution which enables program execution to be speeded up by, in consideration of a memory dependence relationship derived from an order relationship among threads, while ensuring proper program execution results, executing threads in parallel to each other irrespective of the order relationship among threads.

Thread-basis non-program order execution as well requires a dependence relationship among instructions included in a thread to be eliminated or ensured in order to obtain results of proper program execution. However, there is a problem that as well as instruction-basis non-program order execution, with respect to a normal dependence relationship regarding a memory in particular, instructions should be basically executed according to a program order and when the program order execution is deterministically made, the effect of improving execution performance of non-program order execution can not be fully obtained. In particular, thread-basis non-program order execution has a serious problem because non-program order execution is prevented on a basis of a thread composed of a plurality of instructions. An effective solution to this problem is data dependent speculative execution as well as instruction-basis non-program order execution. In other words, effective is thread-basis data dependent speculative execution in which a thread is speculatively executed according to a non-program order before determination is made whether a normal dependence relationship among instructions included in a thread exists or not, assuming that no normal dependence relationship exists.

On the other hand, with respect to a reverse dependence relationship and an output dependence relationship regarding a memory, by, for example, temporarily storing data to be written by a store instruction in a buffer or a memory inherent to a processor, the reverse dependence relationship or the output dependence relationship can be eliminated to enable non-program order execution as is done in instruction-basis non-program order execution.

For example, regarding thread parallel processing conducted in a parallel processor system composed of a plurality of processors each having an inherent cache memory, Japanese Patent No. 3139392 (hereinafter referred to as Literature 6), for example, discloses a cache memory control system which eliminates a reverse dependence relationship and an output dependence relationship regarding a memory. One example of a cache memory control system coping with a normal dependence relationship in addition to a reverse dependence relationship and an output dependence relationship regarding a memory is "Speculative Versioning Cache", by S. Gopal, T. N. Vijaykumar, J. E. Smith, G. S. Sohi et al., Proceedings of the 4th International Symposium on High-Performance Computer Architecture, February 1998 (hereinafter referred to as Literature 7).

In addition to those mentioned above, in the MUSCAT recited in the Literature 2, numerous dedicated instructions are prepared for flexibly controlling parallel operation of threads such as synchronization instructions between threads.

While a parallel processor system in which adjacent processors are connected in a ring in a single direction has an advantage of simplifying hardware, it has a disadvantage of failing to use processor resources effectively when a particle size of a thread varies to result in degrading a degree of parallelization of threads. FIGS. 16 and 17 show such a case. As shown in FIG. 16, when a particle size of a thread is relatively small and substantially uniform, slave thread forking is sequentially conducted in the order of a thread th0, a thread th1, a thread th2 and a thread th3, so that it is highly probable that at a time point where a last processor PE3 conducts slave thread forking, its adjacent processor PE0 is at the free state. Forking of a slave thread th4 from the thread th3 is therefore possible. Similarly possible is forking of a slave thread th5 to the adjacent processor PE1 from the thread th4 to ensure a high degree of parallelization. When the particle size of the thread th0, for example, is larger than that of other thread, however, at a time point where the processor PE3 conducts slave thread forking, its adjacent processor PE0 is still at the busy state executing the thread th0, so that no forking is possible to decrease the degree of parallelization of threads as shown in FIG. 17.

On the other hand, the parallelization processor system shown in FIG. 3 of the Literature 1 adopts a structure in which a plurality of processors are connected to each other through a common bus so as not to limit, to its adjacent processor, other processor to which slave thread forking is made from an individual processor. In the system, state of an individual processor is managed in the free state and the busy state to select a processor to which a slave thread is forked from among processors at the free state and moreover, such a processor as the processor PE1 of FIG. 17 which executes the thread th1 whose master thread th0 is yet to be completed is managed to be at the busy state. It is therefore impossible to conduct slave thread forking from the thread th3 of the processor PE3 to the processor PE1.

In addition, in a case where the thread th1 is a speculative thread, how to handle processing results of the thread th1 poses a problem when releasing resources of the processor PE1. The reasons are that since the thread th1 has a possibility of cancellation by the master thread th0, a processing result of the thread th1 can not be written back to a main memory and that because such a slave thread of the thread th1 as the thread th2 needs to take over the processing result of the thread th1, the processing result of the thread th1 can not be cancelled.

SUMMARY OF THE INVENTION

An object of the present invention, which is proposed in view of the foregoing conditions, is to provide novel multi-thread execution method and parallel processor system enabling effective use of processor resources to increase a degree of parallelization of threads.

According to the first aspect of the invention, a multi-thread execution method of executing a plurality of threads obtained by dividing a single program in parallel to each other by a plurality of thread execution units, comprising the step of merging the thread of the thread execution unit which thread is terminated and yet to be settled into an immediately succeeding slave thread to conduct forking of a new thread to the thread execution unit.

In the preferred construction, a temporary buffer is provided for each individual thread execution unit to, at the merging of a thread that the thread execution unit at a term state has into an immediately succeeding slave thread, transfer a temporary execution result preserved in the temporary buffer of the thread execution unit at the term state to the temporary buffer of the thread execution unit which executes the slave thread.

In another preferred construction, a cache memory serving also as a temporary buffer is provided for each individual thread execution unit to hold, for each cache line of the cache memory, version information which distinguishes data generated by a thread being terminated and yet to be settled and data generated by a thread newly generated after the merging, the cache memory of each thread execution unit making a selective response taking the version information and a thread sequential execution order into consideration in response to access from other thread execution unit.

In another preferred construction, at the time of writing by a thread executed by each thread execution unit to the own cache memory, when the version information of the cache line as a target of write is older than the version of the own thread, queuing is conducted until the version of the cache line in question is appropriately changed according to termination of a master thread to coincide with the version of the own thread.

According to the second aspect of the invention, a multithread execution method of executing a plurality of threads obtained by dividing a single program in parallel to each other by a plurality of thread execution units, comprising the step of managing the respective thread execution units as being at three states, a free state where fork is possible, a busy state where a thread is being executed and a term state where a thread being terminated and yet to be settled exists and at the time of forking of a new thread, when there exists no thread execution unit at the free state, merging a thread that the thread execution unit at the term state has into an immediately succeeding slave thread to bring the thread execution unit in question to the free state and conduct forking of a new thread.

In the preferred construction, a temporary buffer is provided for each individual thread execution unit to, at the merging of a thread that the thread execution unit at the term state has into an immediately succeeding slave thread, transfer a temporary execution result preserved in the temporary buffer of the thread execution unit at the term state to the temporary buffer of the thread execution unit which executes the slave thread.

In another preferred construction, a cache memory serving also as a temporary buffer is provided for each individual thread execution unit to hold, for each cache line of the cache memory, version information which distinguishes data generated by a thread being terminated and yet to be settled and data generated by a thread newly generated after the merging, the cache memory of each thread execution unit making a selective response taking the version information and a thread sequential execution order into consideration in response to access from other thread execution unit.

In another preferred construction, at the time of writing by a thread executed by each thread execution unit to the own cache memory, when the version information of the cache line as a target of write is older than the version of the own thread, queuing is conducted until the version of the cache line in question is appropriately changed according to termination of a master thread to coincide with the version of the own thread.

According to the third aspect of the invention, a parallel processor system for executing a plurality of threads obtained by dividing a single program in parallel to each other by a plurality of thread execution units, comprises a communication path for connecting the respective thread execution units with each other, and means for merging the thread of the thread execution unit which thread is terminated and yet to be settled into an immediately succeeding slave thread to conduct forking of a new thread to the thread execution unit.

In the preferred construction, the parallel processor system further comprises a temporary buffer provided for each individual thread execution unit for, at the merging of a thread that the thread execution unit at a term state has into an immediately succeeding slave thread, transferring a temporary execution result preserved in the temporary buffer of the thread execution unit at the term state to the temporary buffer of the thread execution unit which executes the slave thread.

In another preferred construction, the parallel processor system further comprises a cache memory serving also as a temporary buffer provided for each individual thread execution unit for holding, for each cache line of the cache memory, version information which distinguishes data generated by a thread being terminated and yet to be settled and data generated by a thread newly generated after the merging, the cache memory of each thread execution unit making a selective response taking the version information and a thread sequential execution order into consideration in response to access from other thread execution unit.

In another preferred construction, the cache memory of each thread execution unit, at the time of writing by a thread executed by the own thread execution unit, when the version information of the cache line as a target of write is older than the version of the thread, waits for the version of the cache line in question to be appropriately changed according to termination of a master thread and coincide with the version of the thread.

According to another aspect of the invention, a parallel processor system for executing a plurality of threads obtained by dividing a single program in parallel to each other by a plurality of thread execution units, comprises a communication path for connecting the respective thread execution units with each other, means for managing the respective thread execution units as being at three states, a free state where fork is possible, a busy state where a thread is being executed and a term state where a thread being terminated and yet to be settled exists, and means for, at the time of forking of a new thread, when there exists no thread execution unit at the free state, merging a thread that the thread execution unit at the term state has into an immediately succeeding slave thread to bring the thread execution unit in question to the free state and conduct forking of a new thread.

In the preferred construction, the parallel processor system further comprises a temporary buffer provided for each individual thread execution unit for, at the merging of a thread that the thread execution unit at the term state has into an immediately succeeding slave thread, transferring a temporary execution result preserved in the temporary buffer of the thread execution unit at the term state to the temporary buffer of the thread execution unit which executes the slave thread.

In another preferred construction, the parallel processor system further comprises a cache memory serving also as a temporary buffer which is provided for each individual thread execution unit for holding, for each cache line of the cache memory, version information which distinguishes data generated by a thread being terminated and yet to be settled and data generated by a thread newly generated after the merging, the cache memory of each thread execution unit making a selective response taking the version information and a thread sequential execution order into consideration in response to access from other thread execution unit.

In another preferred construction, the cache memory of each thread execution unit, at the time of writing by a thread executed by the own thread execution unit, when the version information of the cache line as a target of write is older than the version of the thread, waits for the version of the cache line in question to be appropriately changed according to termination of a master thread and coincide with the version of the thread.

While in a conventional parallel processor system, a thread execution unit having a thread being terminated and yet to be settled is managed as being at the busy state, in the present invention it is managed as being at a term state which is distinguished from the busy state. Then, when there exists no thread execution unit at the free state, by merging a thread of a thread execution unit at the term state into its immediately succeeding slave thread to bring the thread execution unit in question to the free state, forking of a new thread is conducted. In an execution sequence, for example, shown in FIG. 1 in which the same conditions as those in FIG. 17 are assumed, since at a time point where the processor PE3 conducts slave thread forking, all the other processors PE0, PE1 and PE2 are at the busy state, a conventional parallel processor system is not allowed to conduct forking, while the present invention enables forking of a thread th4 in the processor PE1 entering the free state from the thread th3 by merging the thread th1 of the processor PE1 being terminated and yet to be settled into the immediately succeeding slave thread th2.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of embodiments of the present invention. It will be obvious, however, to those skilled in the art that the present invention may be practiced without these specific details. For simplicity of presentation, well-known structures are not shown in detail.

Figure 1:
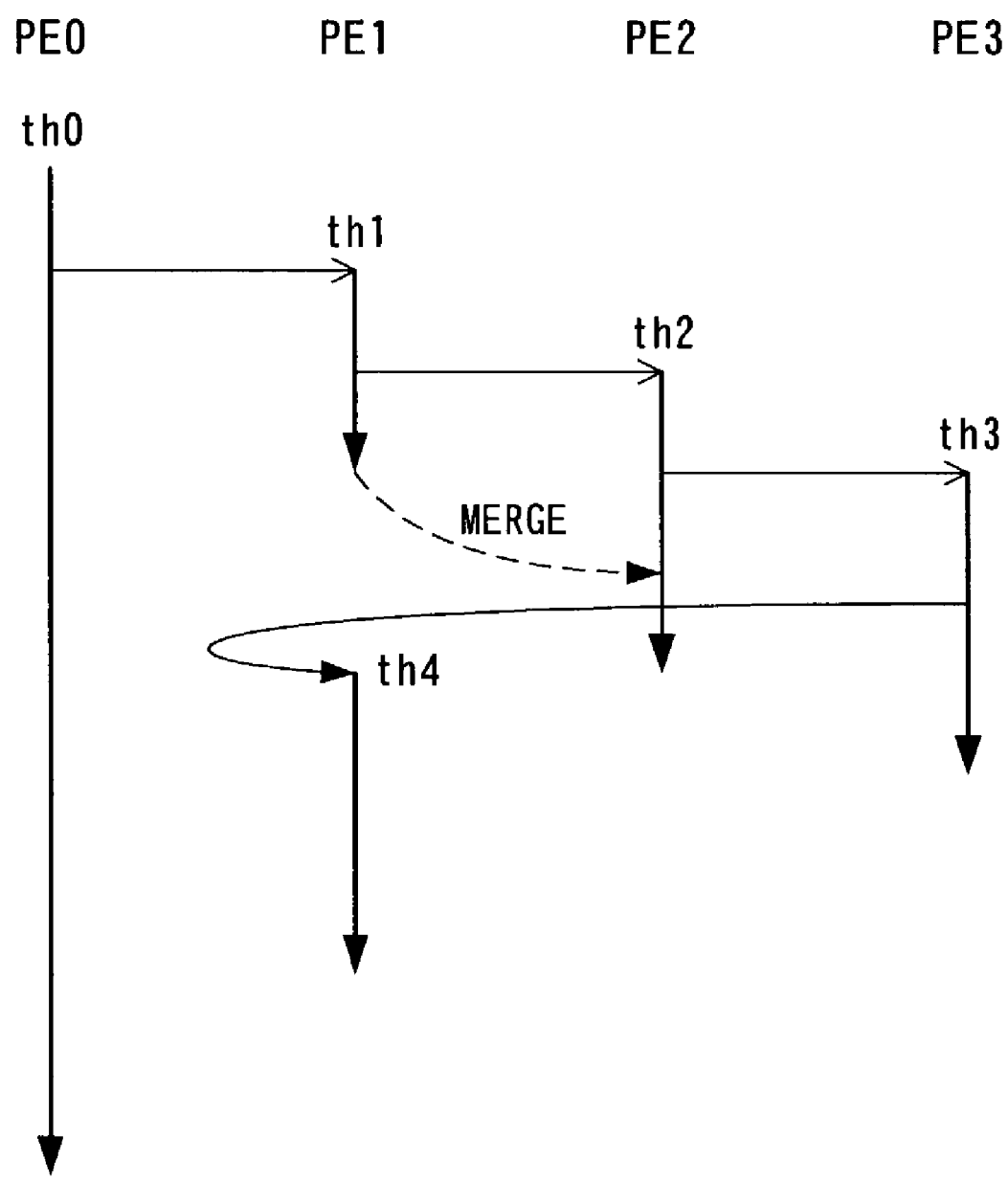
FIG. 1 is a diagram for use in explaining operation of the present invention.
Figure 2:
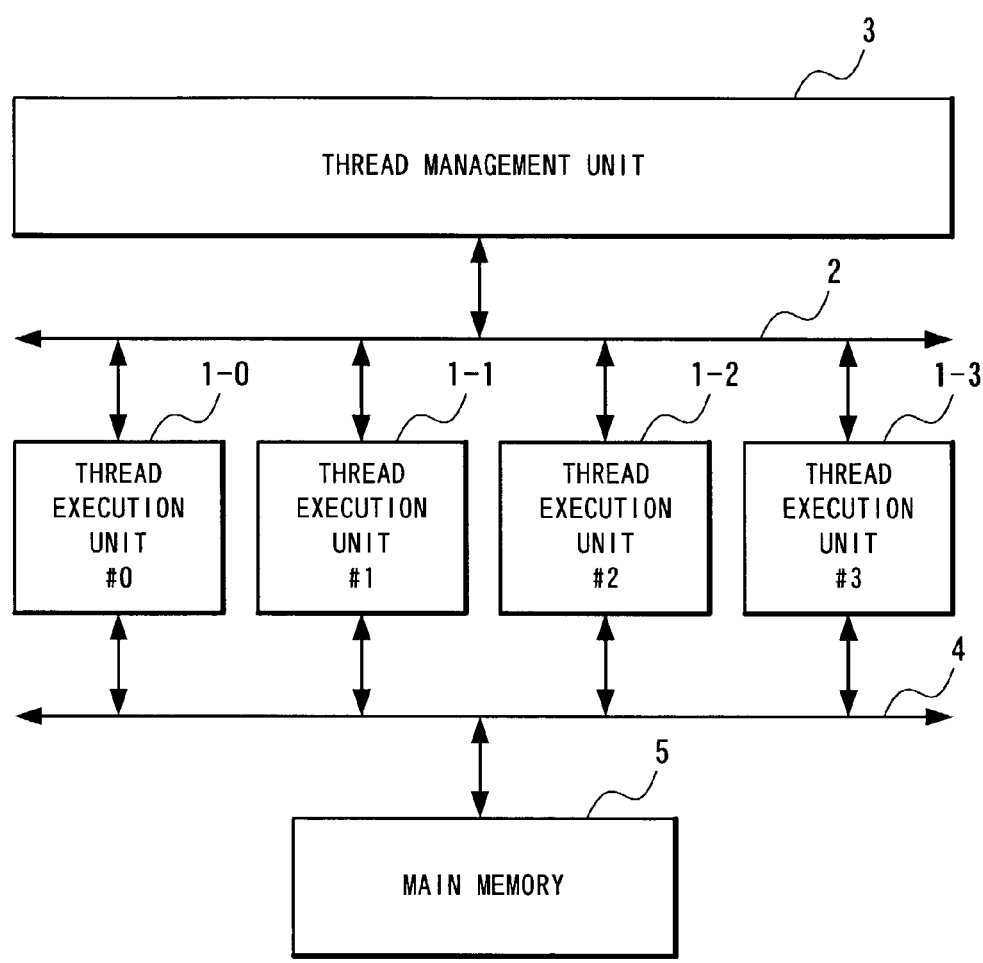
FIG. 2 is a block diagram showing one example of a parallel processor system according to the present invention.

With reference to FIG. 2, one example of a parallel processor system of the present invention is a four-thread parallel execution type processor in which four thread execution units 1-i (i=0~3) are connected to a first bus 2 and a second bus 4, with the first bus 2 connected to a thread management unit 3 for controlling thread generation and stop and the second bus 4 connected to a memory (main memory) 5 shared by all the thread execution units 1-i.

Although a four-thread parallel execution type processor is taken as an example here, the present invention is applicable in general to an n ($\geq$2) thread parallel execution type processor such as an eight-thread or 16-thread parallel execution type processor. In addition, although the communication path (bus 4) for connecting the thread execution units to each other is assumed to be a common bus type in the present embodiment, other kind of communication path such as a cross-bar switch can be also adopted. It is preferable that all the thread execution units 1-i are integrated on one semiconductor chip together with the memory 5 and the thread management unit 3.

Each thread execution unit 1-i includes a processor. Each processor has independent program counter (hereinafter referred to as PC) and register file and has a function of simultaneously fetching, interpreting and executing thread instructions in the memory 5 according to the PC. Each thread execution unit 1-i also has a function of executing a thread at a temporary execution state so as to enable cancellation of thread execution.

Processing result of a thread executed at the temporary execution state is preserved in a temporary buffer. As to the temporary buffer, a dedicated buffer may be used or a cache memory which an individual processor has may be used also as a temporary buffer.

At a time point where a thread start request accompanied by a target PC value is transmitted from the thread management unit 3 through the bus 2, each thread execution unit 1-i starts execution of a thread at the temporary execution state. At that time, the thread execution unit 1-i in question is managed as being at the busy state. The thread execution unit 1-i which ends the execution of the thread transmits a thread stop notification to the thread management unit 3 through the bus 2. When the thread execution unit 1-i in question was executing the oldest master thread, the thread stop notification is accepted by the thread management unit 3, so that the thread execution unit 1-i in question is managed as being at the free state to have a thread stop permission returned to the processor 1-i.

The processor 1-i releases the temporary execution state upon receiving the thread stop permission to end the thread execution and release the processor resources. On the other hand, when a thread being executed by the thread execution unit 1-i which has transmitted the thread stop notification is not the oldest master thread, the thread management unit 3 refrains from issuing the thread stop permission to the thread execution unit 1-i in question and manages the thread execution unit 1-i in question as being at the term state. The thread execution unit 1-i at the term state is managed as being at the free state at a time point where its master thread all ends or the thread of the thread execution unit 1-i in question is merged into its immediately succeeding thread.

Each thread execution unit 1-i is allowed to conduct slave thread forking to other thread execution unit 1-j (i≠j) through the thread management unit 3 by a fork instruction existing in the master thread being executed. In the present embodiment, a fork destination of each thread execution unit 1-i is not limited to its adjacent thread execution unit.

Each thread execution unit 1-i, at the time of slave thread forking, transmits a fork request accompanied with a fork destination address (start PC value) of a slave thread to the thread management unit 3 through the bus 2. Upon receiving the fork request, the thread management unit 3 determines whether fork to other thread execution unit 1-j is possible or not based on a state of other thread execution unit. At that time point, when a thread execution unit at the free state exists, immediate forking is possible. Even if no thread execution unit at the free state exists at that time, when a thread execution unit at the term state exists, by merging a thread of the thread execution unit at the term state into its immediately succeeding slave thread to put the thread execution unit at the term state into the free state, fork is enabled.

When fork is possible, the thread management unit transmits the thread start request accompanied with a fork destination address to the thread execution unit 1-j as a fork destination, while returning a fork response to the thread execution unit 1-i as a fork requesting source. The thread execution unit 1-i having received the fork response conducts register take-over to a register file of the thread execution unit 1-j as the fork destination by copying all the contents of the register file of the master thread through the bus 4 or copying only a register value necessary for the slave thread in question.

On the other hand, when fork to other thread execution unit 1-j is impossible at the time when the fork request is issued from the thread execution unit 1-i, the thread management unit 3 notifies the thread execution unit 1-i as a requesting source to that effect. The thread execution unit 1-i waits execution of processing until, for example, fork is enabled.

Figure 3:
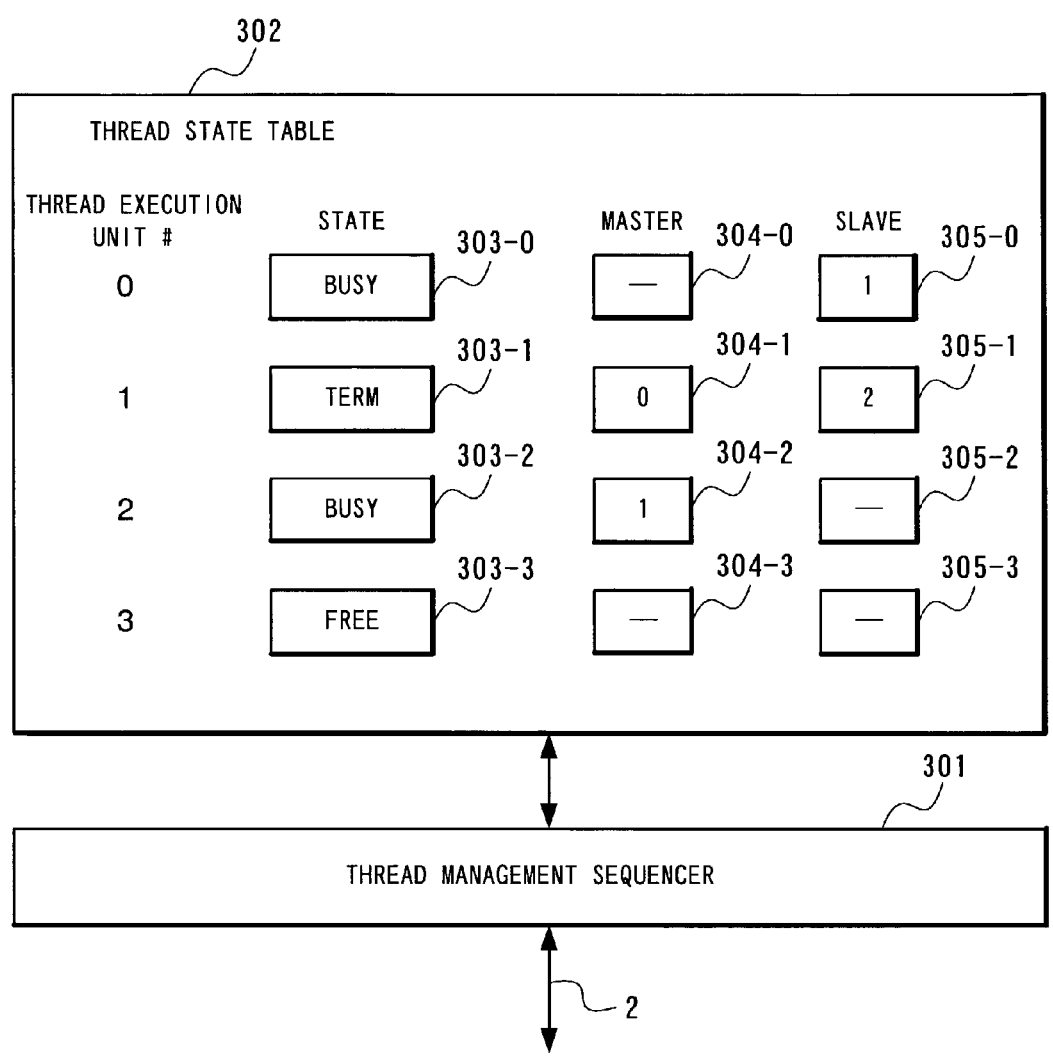
FIG. 3 is a block diagram showing an example of a structure of a thread management unit in the parallel processor system according to the present invention.

With reference to FIG. 3, one example of the thread management unit 3 is composed of a thread management sequencer 301 and a thread state table 302. The thread state table 302 has a state entry 303-i one-to-one corresponding to the thread execution unit 1-i, a master thread execution unit number entry 304-i and a slave thread execution unit number entry 305-i. Each state entry 303-i is used for recording the corresponding thread execution unit 1-i as being at the busy state, the term state or the free state. Each master thread execution unit number entry 304-i indicates the number of other thread execution unit which executes a master thread of a thread being executed at the corresponding thread execution unit 1-i. Each slave thread execution unit number entry 305-i indicates the number of other thread execution unit executing an immediate slave thread of the thread being executed at the corresponding thread execution unit 1-i.

The thread management sequencer 301 manages thread generation and thread stop in each thread execution unit 1-i by using such thread state table 302 as described above. An example of processing of the thread management sequencer 301 to be conducted upon receiving the fork request and the thread stop notification from the thread execution unit 1-i is shown in FIGS. 4 and 5.

Figure 4:
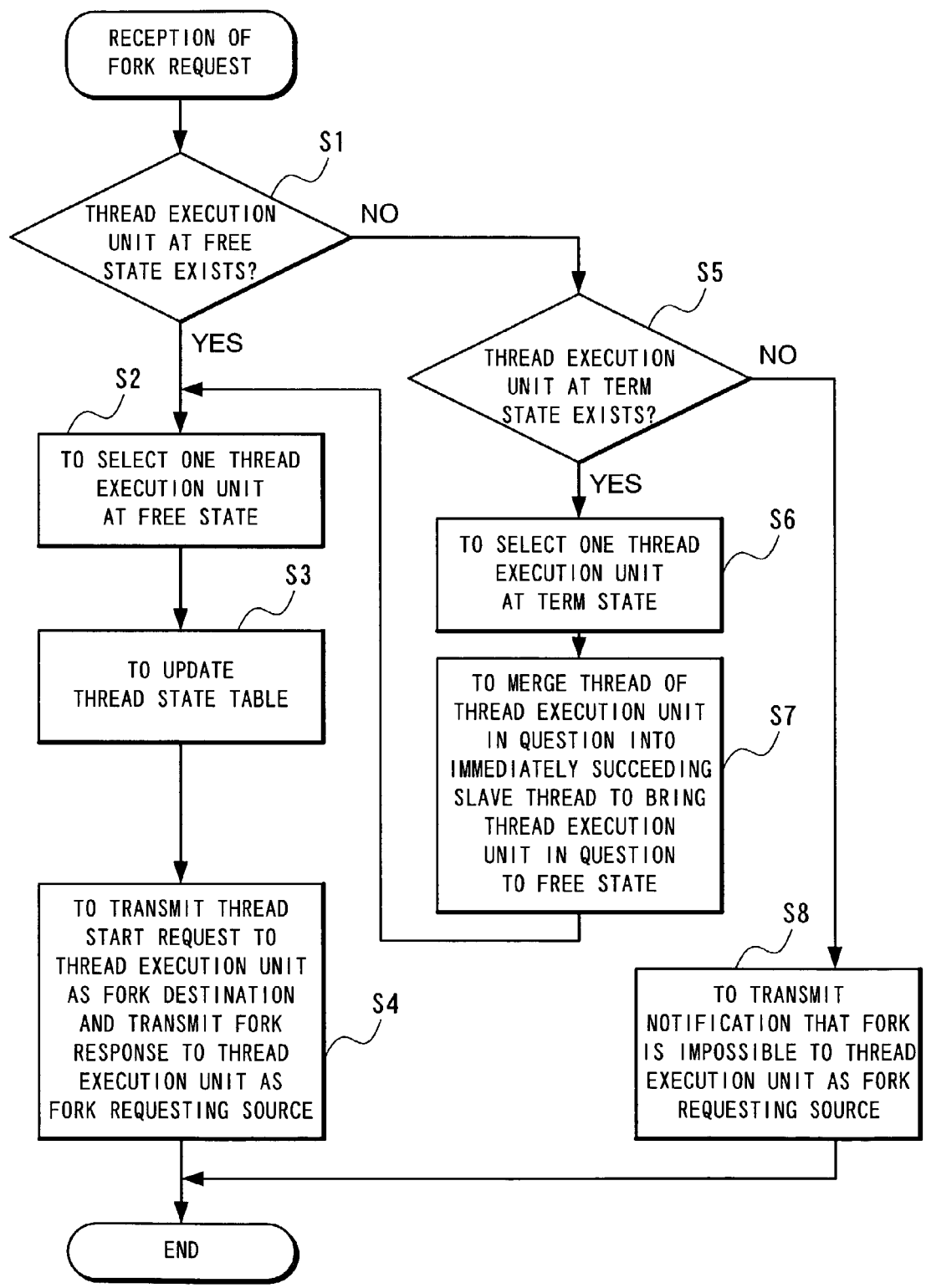
FIG. 4 is a flow chart showing an example of processing to be conducted when a thread management sequencer of the thread management unit in the parallel processor system according to the present invention receives a fork request from a thread execution unit.
Figure 5:
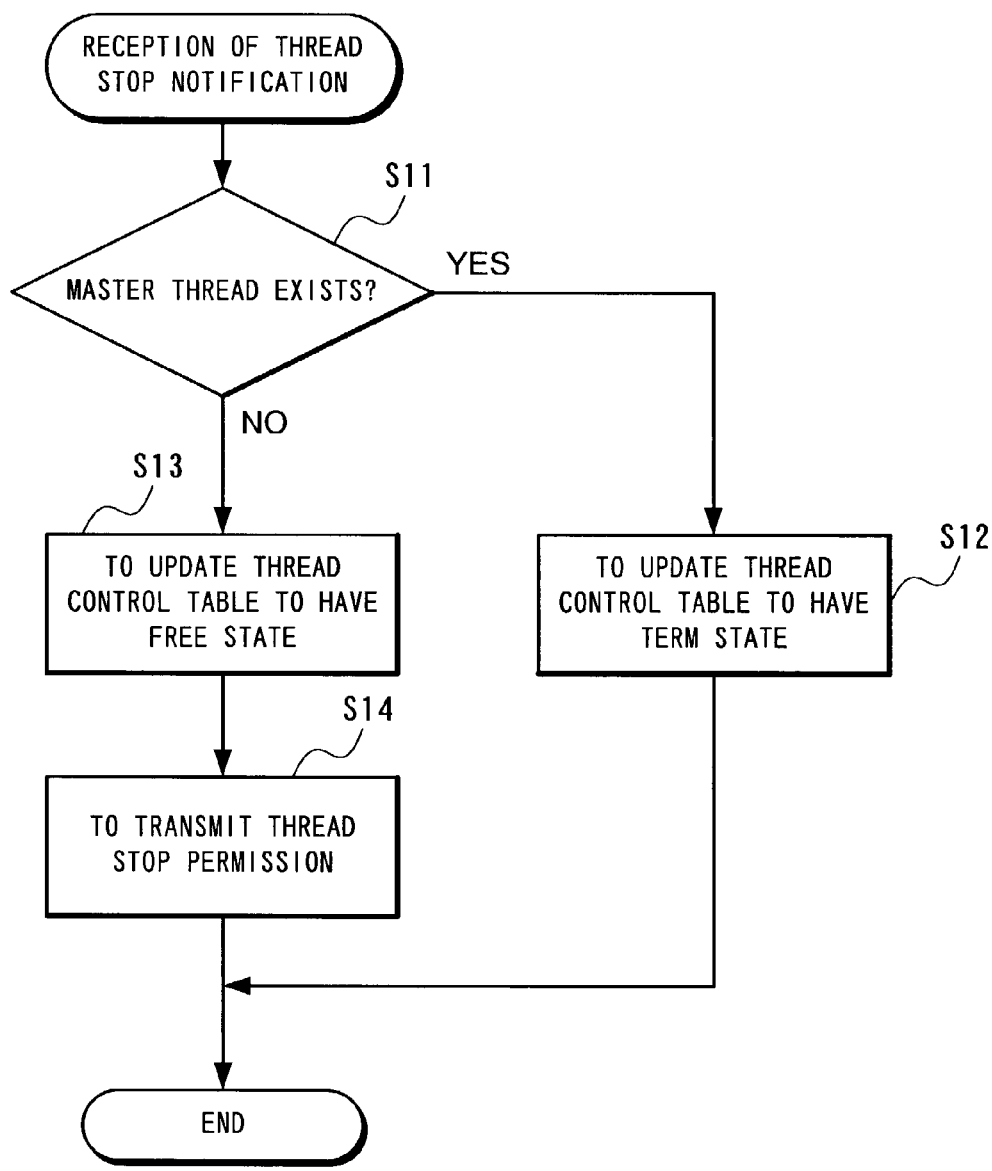
FIG. 5 is a flow chart showing an example of processing to be conducted when the thread management sequencer of the thread management unit in the parallel processor system according to the present invention receives a thread stop notification from the thread execution unit.

With reference to FIG. 4, upon receiving the fork request from the thread execution unit 1-i, the thread management sequencer 301 determines whether there exists a thread execution unit at the free state with reference to the thread state table 302 (Step S1). When free thread execution units exist, select one thread execution unit 1-j from among them (Step S2) to update the thread state table 302 (Step S3).

More specifically, change the state entry 303-j corresponding to the thread execution unit 1-j selected at Step S2 from the free state to the busy state and set the number of the thread execution unit 1-i having made the fork request to the master thread execution unit number entry 304-j. In addition, set the number of the thread execution unit 1-j selected at Step S2 to the slave thread execution unit number entry 305-i corresponding to the thread execution unit 1-i having made the fork request. Then, transmit the thread start request with a fork destination address accompanying the fork request to the thread execution unit 1-j as the fork destination, as well as sending the fork response to the thread execution unit 1-i as the requesting source (Step S4).

On the other hand, when there exists no thread execution unit at the free state (NO at Step S1), the thread management unit 3 refers to the thread state table 302 to determine whether there exists a thread execution unit at the term state (Step S5). When there exists no thread execution unit at the term state, because slave thread forking is physically impossible, transmit a notification to that effect to the thread execution unit 1-i as the fork requesting source (Step S8). On the other hand, when thread execution units at the term state exist, select one thread execution unit 1-j from among them (Step S6) and merge a thread of the selected thread execution unit 1-j into a slave thread generated by the thread in question to bring the thread execution unit 1-j in question to the free state (Step S7). Then, by executing Steps S2 to S4, enable slave thread forking to the thread execution unit brought to the free state this time.

Processing of Step S7 will be described more specifically. First, change the state entry 303-j corresponding to the thread execution unit 1-j selected at Step S6 from the term state to the free state. Next, set the contents of the master thread execution unit number entry 304-j corresponding to the thread execution unit 1-j to the master thread execution unit number entry 304-k corresponding to the thread execution unit 1-k specified by the number set to the slave thread execution number entry 305-j.

Next, set the contents of the slave thread execution unit number entry 305-j corresponding to the thread execution unit 1-j to the slave thread execution unit number entry 305-i corresponding to the thread execution unit 1-i specified by the number set at the slave thread execution unit number entry 305-j. Lastly, set the slave thread execution unit number entry 305-j corresponding to the thread execution unit 1-j to NULL. As a result, in terms of thread management, the thread of the thread execution unit 1-j is merged into its immediately succeeding slave thread execution unit.

Taking the thread execution unit 1-1 at the term state in FIG. 3 as an example, change the state entry 303-1 from the term state to the free state, set the contents "0" of the master thread execution unit number entry 304-1 to the master thread execution unit number entry 304-2 of the thread execution unit 1-2 executing the slave thread and set the contents "2" of the slave thread execution unit number entry 305-1 to the slave thread execution unit number entry 305-0 of the thread execution unit 1-0 executing the master thread to bring the contents of the slave thread execution unit number entry 305-1 to "NULL".

Although the foregoing processing results in that the thread of the thread execution unit 1-j is merged into its immediately succeeding slave thread in terms of thread management, the problem how the temporary execution result remaining at the thread execution unit 1-j remains. One solution to this problem is transferring the contents of the temporary buffer of the thread execution unit 1-j to the temporary buffer of a thread execution unit executing the merged slave thread through the bus 4 and storing the same to release the temporary buffer of the thread execution unit 1-j. This solution, however, might deteriorate performance because overhead involved in data transfer is big.

Another method is distinguishably managing, in the temporary buffer of the thread execution unit 1-j, a temporary execution result of the merged thread and a temporary execution result of a new thread to be newly executed at the thread execution unit 1-j and handling the temporary execution result of the merged thread as data valid for its slave thread, while handling the temporary execution result of the new thread newly executed at the thread execution unit 1-j as data invalid for threads between the merged thread and the new thread in question. The latter method will be described later taking a detailed embodiment as an example.

With reference to FIG. 5, upon receiving the thread stop notification from any of the thread execution units 1-i, the thread management sequencer 301 determines whether there exists a master thread of a thread being executed by the thread execution unit 1-i based on whether the master thread execution unit number entry 304-i corresponding to the thread execution unit 1-i in the thread state table 302 is cleared to NULL (Step S11). When the master thread exists, update the state entry 303-i corresponding to the thread execution unit 1-i from the busy state to the term state (Step S12).

On the other-hand, when no master thread exists, update the thread state table 302 at Step 13. Here, update the state entry 303-i corresponding to the thread execution unit 1-i in question from the busy state to the free state and when its slave thread execution number entry 305-i is not NULL, clear the master thread execution unit number entry 304-j corresponding to the thread execution unit 1-j executing a slave thread specified by the value of the entry 305-i to NULL and also clear the slave thread execution unit number entry 305-i to NULL. In addition, when the state entry 303-j of the thread execution unit 1-j whose master thread execution unit number entry 304-j is set to NULL is at the term state, bring the thread execution unit 1-j to the free state as well.

More specifically, set the state entry 303-j to the free state and when its slave thread execution unit number entry 305-j is not NULL, clear the master thread execution unit number entry 304-k corresponding to the thread execution unit 1-k executing a slave thread specified by the value of the entry 305-j to NULL and also clear the slave thread execution unit number entry 305-k to NULL. Thereafter, change all the thread execution units which can be brought to the free state by the end of the master thread to the free state in the same manner. Then, at the subsequent Step S14, transmit the thread stop permission to all the thread execution units changed to the free state.

In a case where the thread stop notification is issued from, for example in FIG. 3, the thread execution unit 1-0, the state entry 303-0 is changed to the free state and the master thread execution unit number entry 304-1 of the thread execution unit 1-1 executing the slave thread is set to NULL. In addition, since the state entry 303-1 is at the term state, the state entry 303-1 is changed to the free state and the master thread execution unit number entry 304-2 of the thread execution unit 1-2 executing the slave thread is set to NULL. In this case, the thread stop notification is transmitted to the thread execution unit 1-0 and the thread execution unit 1-1.

As described in the foregoing, according to the present embodiment, an individual thread execution unit is managed in any of the three states, the free state, the busy state and the term state and when a slave thread fork is requested by any of the thread execution units, if no free thread execution unit exists, by merging a thread whose execution is terminated and which is yet to be settled in a thread execution unit at the term state into its immediately succeeding slave thread, a free thread execution unit is dynamically generated to enable fork to the thread execution unit, thereby enabling effective use of processor resources to increase a degree of thread parallelization.

Next, detailed description will be made of an embodiment which enables a temporary execution result of a thread merged into an immediately succeeding slave thread to be efficiently handled. In the following, a thread whose execution is terminated and not settled because its master thread is yet to be stopped or for other reason will be referred to as a thread being terminated and yet to be settled. Fork to a processor having a thread being terminated and yet to be settled will be referred to as free fork. Free fork denotes processing of merging a thread being terminated and yet to be settled into an immediately succeeding slave thread to execute a new thread generated by the fork in question.

[Problem in Cache Memory]

Figure 6:
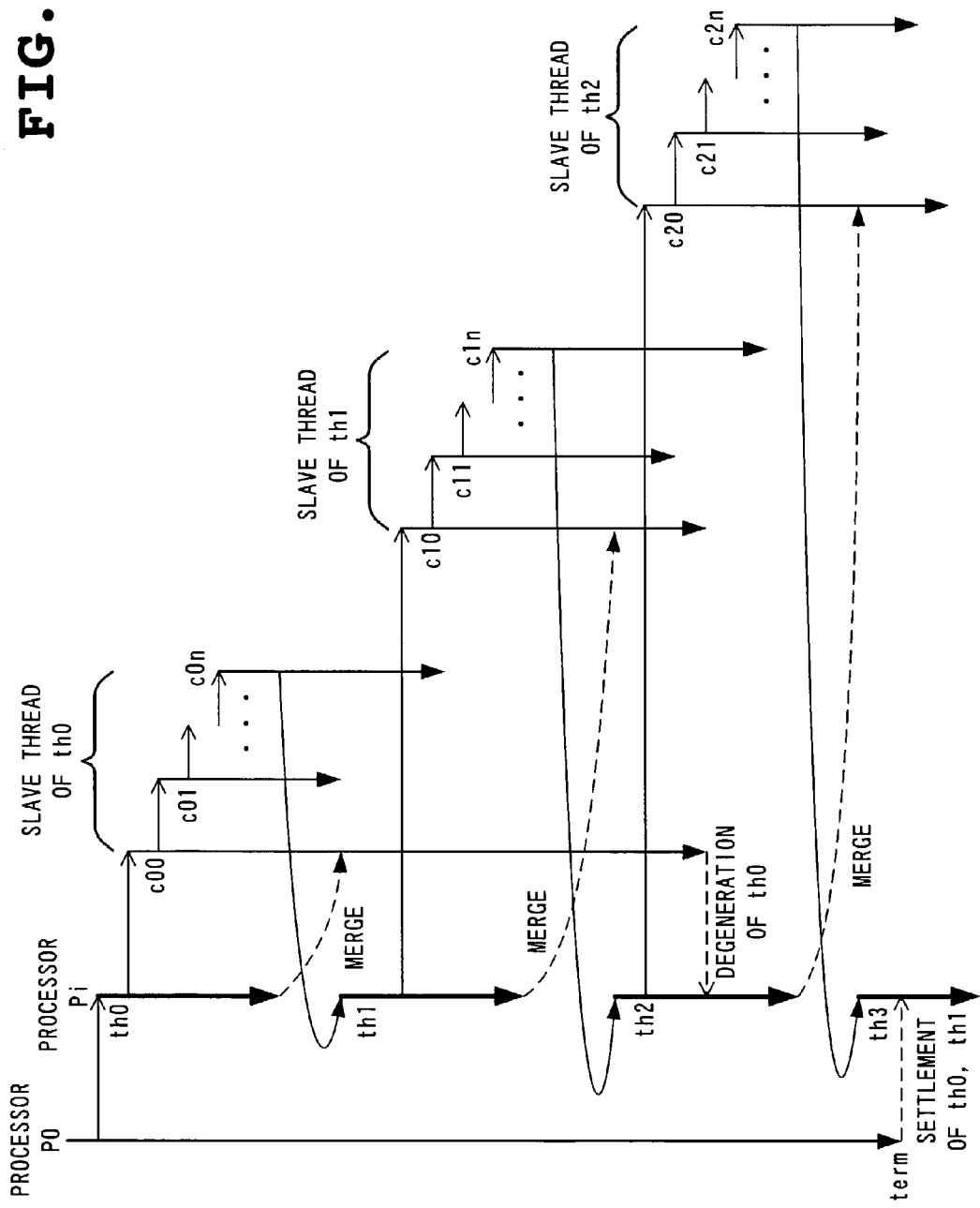
FIG. 6 is a diagram of a thread execution sequence for use in explaining a problem occurring when a cache memory which an individual processor inherently has is used also as a temporary buffer.

First, description will be made of a problem posed when a cache memory which an individual processor inherently has is used also as a temporary buffer with reference to FIG. 6 showing an example of a thread execution sequence. FIG. 6 shows such an execution sequence as described below.

(1) A thread on a processor P0 is forked into a thread th0 in a processor Pi and the thread th0 is forked sequentially into threads c00, c01, . . . , c0n in a plurality of other processors. The threads c00 to c0n are slave threads seen from the thread th0.

(2) At the time of forking of the thread c0n, the thread th0 in the processor Pi is terminated, but its master thread is not, so that the thread th0 is a thread being terminated and yet to be settled. Therefore, the thread th0 is merged into its immediately succeeding slave thread c00, and to the processor Pi brought to the free state by the merge, a new thread th1 is forked from the thread c0n. Thereafter, the new thread th1 is forked sequentially into threads c10, c11, ..., c1n. The threads c10~c1n are slave threads seen from the new thread th1.

(3) Since at the time of forking of the thread c1n, the thread th1 in the processor Pi is terminated, but its master thread is not, the thread th1 is a thread being terminated and yet to be settled. Therefore, the thread th1 is merged into its immediately succeeding slave thread c10, and to the processor Pi brought to the free state by the merge, a new thread th2 is forked from the thread c1n. Thereafter, the new thread th2 is forked sequentially into threads c20, c21, ..., c2n. The threads c20~c2n are slave threads seen from the new thread th2.

(4) Since at the time of forking of the thread c2n, the thread th2 in the processor Pi is terminated, but the master thread is not, the thread th2 is a thread being terminated and yet to be settled. Therefore, the thread th2 is merged into its immediately succeeding slave thread c20, and to the processor Pi brought to the free state by the merge, a new thread th3 is forked from the thread c2n.

When such a sequence as described above is executed, data generated by the thread th0 being terminated and yet to be settled and stored in a cache memory of the processor Pi is valid for the threads c00~c0n slave to the thread th0. On the other hand, data generated as a result of the thread th1 generated as a result of free fork and stored in the cache memory of the processor Pi is not valid for the threads c00~c0n slave to the thread th0 from the thread th0 to the thread th1 because it is lower in the order in the program. It is accordingly necessary to distinguish the date generated by the thread th0 from the data generated by the thread th1 until all the threads c00~c0n are terminated. Data generated by the threads th2 and th3 should be distinguished from each other as well.

It is, however, impossible to write the data generated, for example, by the thread th0 back to the main memory because the thread th0 is yet to be settled. In addition, the method of transferring the data generated by the thread th0 to the cache memory of the processor executing the immediately succeeding slave thread c00 and storing the same will have big overhead to deteriorate performance or the like.

The present embodiment thus solves the problem in a manner as described in the following.

1. A plurality of versions of data are distinguishably held on the same cache. For this purpose, a storage means (vid) indicative of a version is provided for each cache line to manage the versions on a cache line basis. A new version will be generated when a thread generated by free fork and being currently executed conducts writing in response to a store instruction or the like and otherwise it will not be generated. For example, a version generated by the thread th0, a version generated by the thread th1, ..., are distinguishably held on the cache of the processor Pi.

2. In response to access from other processor (other thread), selective response taking a thread order into consideration is made with reference to a version. For example, to the access between the threads c00~c0n slave to the thread th0 between the thread th0 and the thread th1, the cache line for the version of the thread th0 responds, while the cache lines for the versions of the threads following the thread th1 will not respond. To access from the threads c10~c1n slave to the thread th1 between the thread th1 and the thread th2, the cache lines for the versions of the threads th0 and th1 respond, while lines for the versions of the threads subsequent to the thread th2 will not respond.

3. When the need of discrimination of versions is eliminated, degenerate the versions. For example, when all of the threads c00~c0n slave to the thread th0 between the thread th0 and the thread th1 are terminated, since discrimination between the version of the thread th0 and the version of the thread th1 is unnecessary, degenerate the versions of the thread th0 and the thread th1 then.

4. Selectively settle a thread (data) with reference to a version. For example, when the thread th0 is settled, settle only the cache line for the version of the thread th0. The lines for the versions of the threads th1 and th2 remain unsettled (speculative).

5. Generation of a cache line for a different version of the same address can be handled by any of the following three manners.

a): Allow generation of a cache line for a different version of the same address.

In this case, at the time of version degeneration, there might occur a case where a plurality of lines (of the same version) of the same address are generated. Therefore, at the time of degeneration, conduct processing of invalidating a line of an old version among versions to be degenerated.

b): Generate no cache line for a different version of the same address.

At the time of writing by a thread generated by free fork, when the target line has an old version and is a line written by its own processor before (dirty line), delay execution of write until the old version is degenerated to the current version to avoid generation of a plurality of versions.

c): Although similarly to b), no cache line for a different version of the same address is generated, at the time of write by a thread generated by free fork, when the target line is a dirty line having an old version, after transferring the line in question to a cache memory of a processor executing its immediately succeeding slave thread, invalidate the line in question to then execute write, thereby avoiding generation of a plurality of versions.

d): Although similarly to b), no cache line for a different version of the same address is generated, at the time of write by a thread generated by free fork, when the target line is a dirty line having an old version, execute write without conducting any other processing, while storing abandonment of data of the old version, thereby avoiding generation of a plurality of versions. When access is made from other processor to the data of the abandoned old version, cancel execution of a thread having generated the data of the abandoned old version and all the slave threads of the thread in question and then re-execute the cancelled threads to ensure the data dependence relationship. This system can be realized, for example, by providing each cache line with a storage means indicating that data of an old version is abandoned.

Embodiment

Outlines of an embodiment conforming to the foregoing policy will be as follows.

First, in addition to a valid flag, a change flag, an address tag and a data entry, etc., a cache line has at least a version identifier vid indicative of a version of data. The version identifier vid has as many bits as the number of processors that the multi-processor system has excluding its own processor, with each bit corresponding to other processor excluding its own processor.

When write for a store instruction or the like is executed, a version identifier vid of a target line is set. Bits to be set are those corresponding to processors executing all the master threads of threads in question excluding a merged thread and the remaining bits are reset.

When a certain thread is terminated, in version identifiers vid of all the cache lines of the cache memories of all the processors excluding a processor executing the thread in question, reset a bit corresponding to the processor executing the thread in question. This processing can be realized with ease by, for example, forming the version identifier vid by a memory cell with a batch reset function.

More specifically, the version identifier vid indicates a processor as of that time which executes a master thread yet to be terminated among all the master threads of threads generating its own cache line. As to cache lines for different versions generated by two threads executed on a certain processor Pi, the version identifiers vid indicate the same version at the time when all the threads between the two threads in the program order are terminated, which means that degeneration is made.

When other processor accesses the own cache memory to hit the same, the version identifier vid is referred to. In a case where a bit of the version identifier vid corresponding to the other processor in question is set, determination can be made that the access is made from a master thread of the own cache line. In this case, since the data of the own cache line is low in the program order and is therefore invalid, the own cache memory makes no response to the access.

On the other hand, when a bit of the version identifier vid corresponding to the other processor in question is reset, determination can be made that the access is made from a thread slave to the own cache line. In this case, since the data of the own cache line is high in the program order and is therefore valid, the own cache memory makes an appropriate response processing to the access.

When reset of the version identifier vid by the termination results in resetting all the bits of the version identifier vid, the data of the own cache line will be at least settled. In other words, data of a cache line whose version identifier vid have all its bits reset can be written back to the main memory or the like.

SPECIFIC EXAMPLE

Next, with reference to FIG. 7, a specific example of the present embodiment will be described with respect to a multi-processor system composed of four processors P0 to P3 noting to the processor P1.

Figure 7:
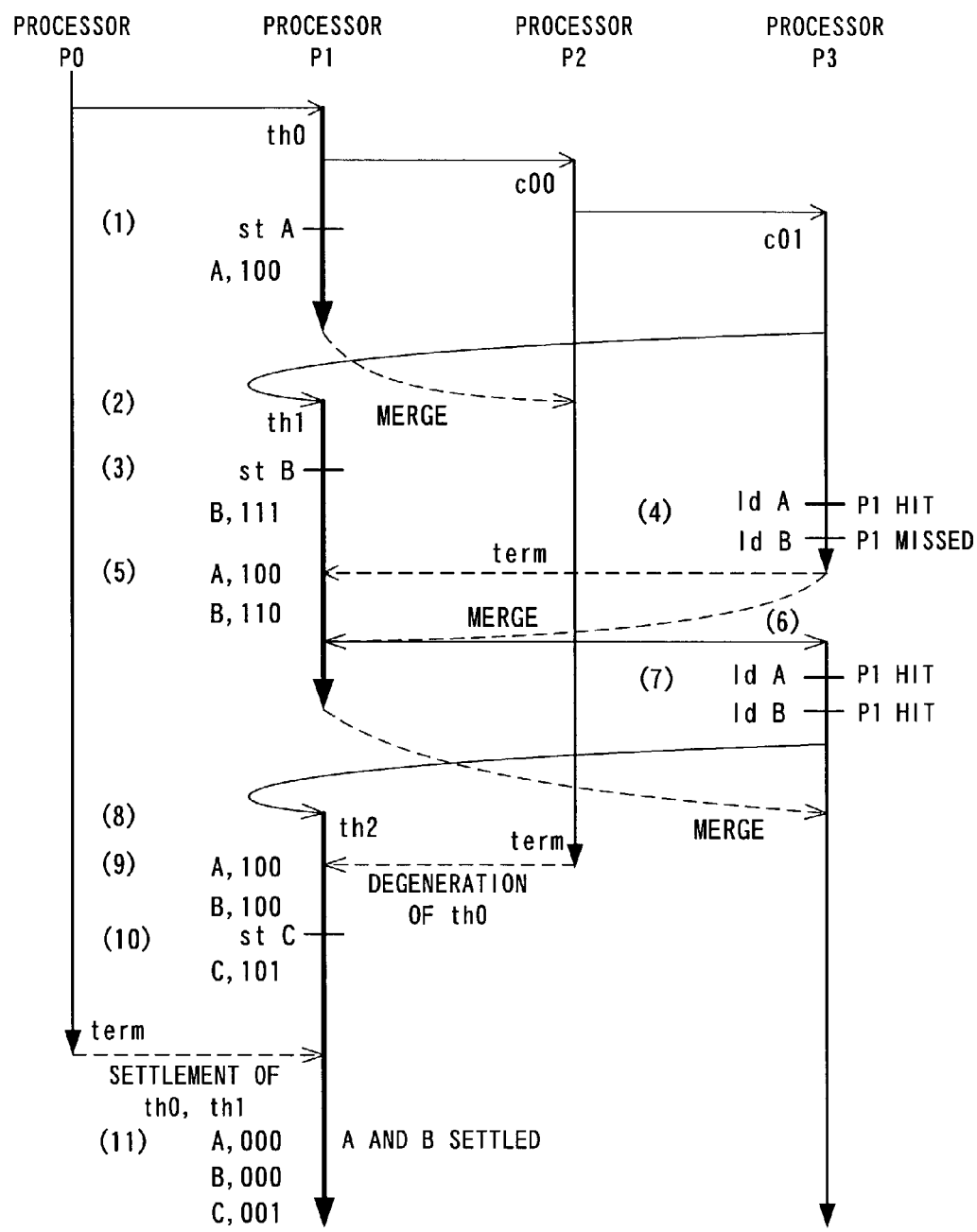
FIG. 7 is a diagram for use in explaining a cache memory control method in one embodiment of the present invention.

In (1) of FIG. 7, in a thread th0 executed on the processor P1, a store instruction (stA) for an address A is executed to make the version of the cache line of the address A be 100. In the figure, "A, 100" indicates that the address is A and the value of the version identifier vid is 100. The respective bits of the version identifier vid correspond to the processors P0, P2 and P3, respectively, from the left. In other words, since at this time point, for the thread th0, its master thread is executed only at the processor P0, the version identifier vid is set to be 100.

In (2) of FIG. 7, after the thread th0 is terminated at the processor P1, a thread th1 is generated from a thread c01 by free fork. The thread th0 is merged into a thread C00. Since the merging will cause no such processing as data transfer, overhead in the free fork is little.

In (3) of FIG. 7, a store instruction for an address B is executed in the thread th1. Since the master thread of the thread th1 is executed in the processors P0, P2 and P3, the version of the cache line of the address B will be 111 (in the figure, "B, 111").

In (4) of FIG. 7, at the thread c01 executed on the processor P3, a load instruction (1dA) for the address A and then a load instruction (1dB) for the address B are executed. Here, when both the two load instructions miss the cache memory of the processor P3, the cache memory of the processor P1 is also accessed. When hitting in the access to the cache memory of the processor P1, first, since the version identifier vid for the address A is 100, it is found that the thread c01 is a thread slave to the thread th0 generating the version of the cache line of the address A, so that response processing to be conducted at hitting such as data transfer is executed in response to the access in question. On the other hand, in the access to the address B, since the version identifier vid of the cache line of the address B is 111, it is found that the thread c01 is a master thread of the thread th1 generating the cache line of the address B, so that no response is made to the access in question. Thus, only by referring to the version identifier vid, a selective response to access from other processor can be made with ease taking a version into consideration.

In (5) of FIG. 7, the thread c01 executed on the processor P3 is terminated to also notify the processor P1 to that effect. As a result, in the version identifiers vid of all the cache lines of the cache memory in the processor P1, bits corresponding to the processor P3 are reset. Relevant bits of the cache lines of the address A and the address B are also reset to have 100 and 110, respectively.

In (6) of FIG. 7, free fork is executed from the thread th1 to the processor P3 to generate a thread c10 in the processor P3. As a result, the terminated thread c01 is merged into the thread th1.

In (7) of FIG. 7, at the thread c10 executed on the processor P3, the load instruction (1dA) for the address A and then the load instruction (1dB) for the address B are executed. Here, when both the two load instructions miss the cache memory of the processor P3, the cache memory of the processor P1 is also accessed. In this case, when hitting to the cache memory of the processor P1, since the version identifier vid of the line of the address A is 100 and the version identifier vid of the line of the address B is 110, it is found that the thread c10 is a slave thread for both threads, so that a response will be made by both the threads to the access in question. Thus, only by referring to the version identifier vid, a selective response to access from other processor could be made with ease taking a version into consideration.

In (8) of FIG. 7, in the processor P1, after the thread th1 is terminated, free fork is executed from the thread c10 to generate a thread th2. The thread th1 is merged into the thread c10.

In (9) of FIG. 7, the thread c00 executed on the processor P2 is terminated to also notify the processor P1 to that effect. As a result, in the version identifiers vid of all the cache lines of the cache memory in the processor P1, bits corresponding to the processor P2 are reset. Relevant bits of the cache lines of the address A and the address B are also reset to have 100 and 100, respectively. In other words, the above-described two lines will have the same version. This corresponds to the fact that the threads c00 and c01 between the thread th0 generating the version of the address A and the thread th1 generating the version of the address B are terminated at this time point to eliminate the need of discriminating the two versions, so that the version of the thread th0 is degenerated to the version of the thread th1. Thus, it is also a feature of the present embodiment that degeneration of a version is conducted with ease when the need of discrimination among versions is eliminated.

In (10) of FIG. 7, a store instruction (stC) for an address C is executed at the thread th2. Since the master thread of the thread th2 is executed on the processors P0 and P3, the version identifier of the cache line of the address C will be set to 101.

In (11) of FIG. 7, the thread executed on the processor P0 is terminated to result in that in the version identifiers vid of all the cache lines of the cache memory in the processor P1, bits corresponding to the processor P0 are reset. Relevant bits of the cache lines of the addresses A, B and C are also reset to be 000, 000 and 001, respectively. In other words, the lines of the addresses A and B have their version identifiers vid all reset to find that data is settled. This corresponds to the fact that the threads th0 and th1 generating the respective versions become the oldest master thread as of that time. On the other hand, since the version identifier vid of the line of the address C is 001, it is found that the master thread c10 for the thread th2 generating the version of the address C exists in the processor P3 to unsettle the data. Thus, only by referring to the version identifier vid, the present embodiment enables selective determination whether a cache line is settled or not with ease taking a version into consideration.

[Effects of the Present Embodiment]

Thus according to the present embodiment, by managing a plurality of data versions on one cache memory, high-speed thread parallel processing can be realized without causing overhead such as data transfer at the time of thread merging and free forking.

Moreover, by expressing a version by a processor executing a master thread as of that time, such data dependence eliminating processing can be realized with ease and little overhead and at a high speed as selective response to access taking a version into consideration, version degeneration and selective settlement processing taking a version into consideration.

Furthermore, since a version identifier vid is appropriately changed according to termination of other thread to conduct version degeneration, no limit is set to the number of times of free forking.

In addition, since all the above-described information necessary for a selective response to access and settlement processing is stored in the version identifier vid, it is unnecessary to additionally store and manage information about a thread which was terminated before and is yet to be settled, its merging and a thread order relationship.

APPLICATION EXAMPLE

Next, detailed description will be made of an example of application of the above-described cache memory control method to the parallel processor system shown in FIG. 2 with reference to the drawings.

Figure 8:
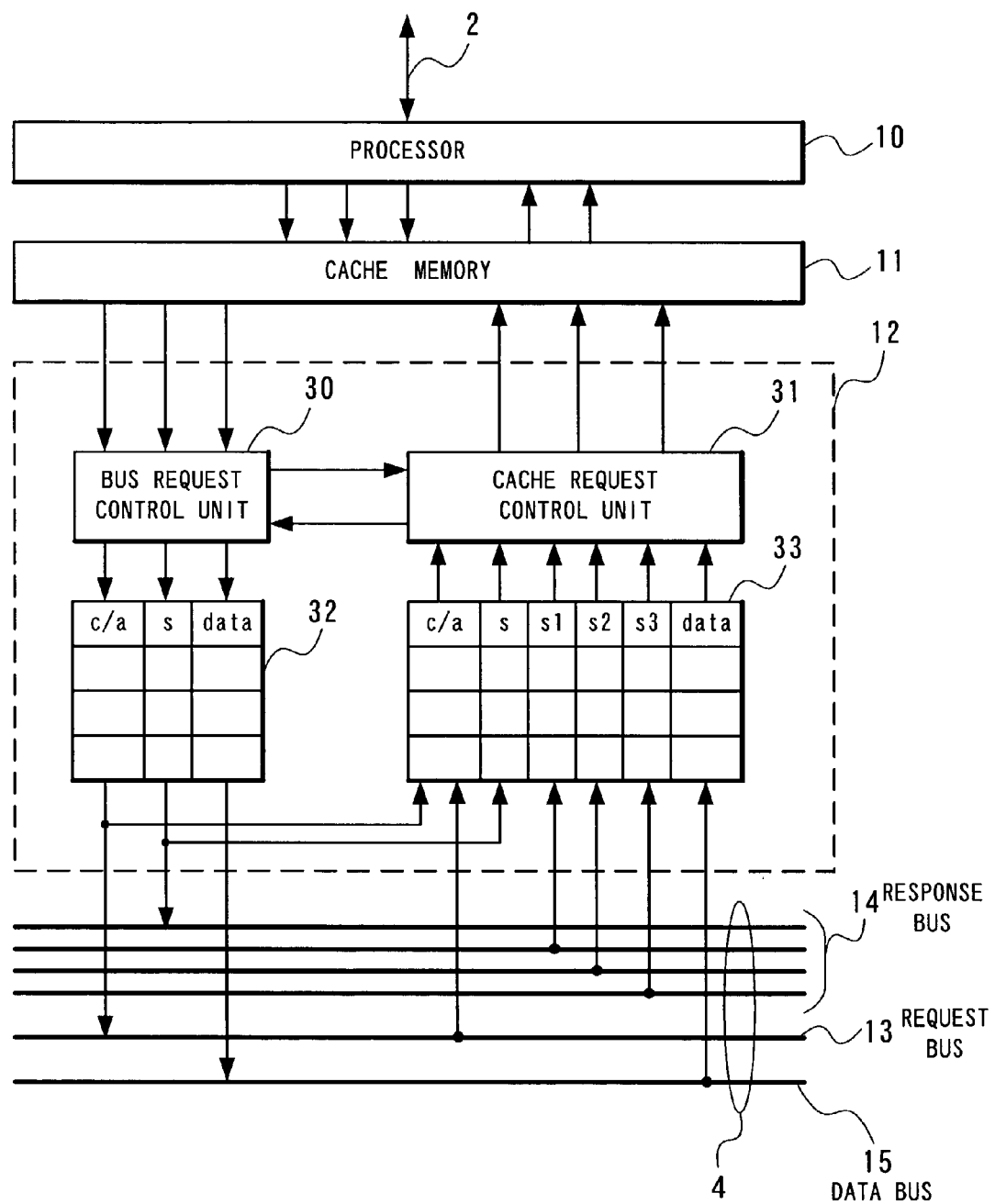
FIG. 8 is a block diagram showing an example of a structure of the thread execution unit in the parallel processor system of the present invention.

FIG. 8 is a block diagram showing a structure of the thread execution unit 1-i. With reference to FIG. 8, the thread execution unit 1-i includes a processor 10, a cache memory 11 and a cache control unit 12, with the processor 10 connected to the bus 2 and the cache control unit 12 connected to the bus 4. The bus 4 includes a request bus 13, a response bus 14 and a data bus 15 as buses related to cache control.

The processor 10 is connected to the cache memory 11 and the cache control unit 12 to execute a thread in parallel with a processor of other thread execution unit. The processor 10 is connected to the thread management unit 3 and a processor of other thread execution unit through the bus 2 to communicate control information related to thread execution such as thread generation, termination and cancellation of thread execution and an order relationship among threads. With reference to the thread control information transmitted through the bus 2, the processor 10 is allowed to know an order relationship between a thread which it executes and a thread which other processor executes.

The cache control unit 12 controls transmission and reception of memory data as a target of a memory operation instruction to and from other processor and the main memory 5 through the request bus 13, the response bus 14 and the data bus 15. At this time, the unit 12 tries to maintain consistency between memory data with reference to a thread order relationship notified by a processor and taking a normal dependence relationship, a reverse dependence relationship and an output dependence relationship related to a memory into consideration. As the request bus 13, the response bus 14 and the data bus 15, each one bus may be shared by the respective processors or as many inherent buses as the number of processors may be provided. In the following, the request bus 13, the response bus 14 and the data bus 15 will be also generically and simply referred to as a bus.

Figure 9:
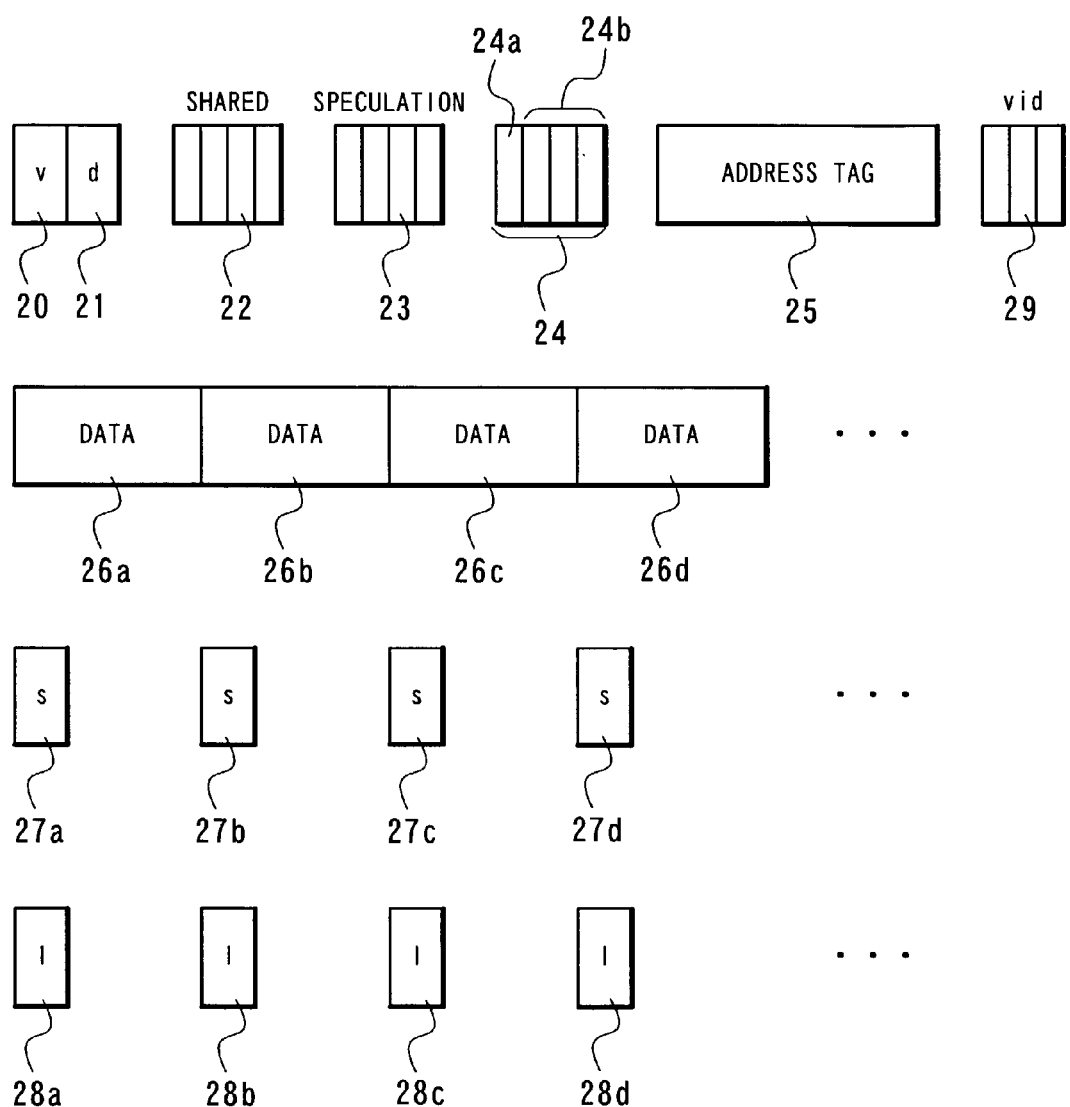
FIG. 9 is an explanatory diagram showing details of a first embodiment of a cache line forming a cache memory.

FIG. 9 is an explanatory diagram showing details of cache lines forming the cache memory 11. One cache line holds data within an address range indicated by an address tag 25. With reference to FIG. 9, the cache line forming the cache memory is composed of a valid flag 20, a change flag 21, a shared flag 22, a speculation flag 23, an update flag 24, the address tag 25, a plurality of data entries 26, a plurality of store flags 27, a plurality of speculative load flags 28 and a version identifier (vid) 29.

The valid flag 20 indicates that the cache line is valid. The valid flag 20 is set at the time of transferring data to the cache memory to generate (refill) a cache line when a cache miss occurs and is reset at the time of invalidating a cache line when the cache line is replaced.

The change flag 21 indicates that data of the cache line is changed in response to a store instruction or the like to become different (dirty) from data in the main memory. The change flag 21 is set when data writing is executed in response to a store instruction etc. and reset when write back to the main memory from the cache line to the main memory is conducted.

The shared flag 22 indicates that a cache line of the same address as that of the cache line in question is held by a cache memory inherent to other processor to share data. The shared flag according to the present embodiment has as many flags as the number of processors that the parallel processor system has. More specifically, each flag portion corresponds to each processor and when the flag is set, it indicates that data is shared with a processor corresponding to the flag in question and when the same is reset, the data is not shared with the processor corresponding to the flag in question. Reference to the shared flag 22 accordingly enables a processor with which data is shared to be specified. The shared flag 22 is set or reset when bus access is made. In more detailed description, when a certain processor makes bus access through the cache control unit 12, the cache control units 12 of all the processors are notified of a cache line state of every cache memory 11 through the response bus 14. At that time, since with which processor data is shared is found, among the flags forming the shared flag 22, a flag corresponding to the processor with which the data is shared is set and a flag corresponding to a processor with which the data is not shared is reset.

The speculation flag 23 indicates that data of the cache line includes speculative data. The speculation flag according to the present embodiment has as many flags as the number of processors that the parallel processor system has. More specifically, each flag portion corresponds to each processor and when the flag is set, it indicates that a processor corresponding to the flag in question is a cause of data being speculative. Reference to the speculation flag 23 accordingly enables a processor causing data of the cache line in question to be speculative to be specified.

At the time of refilling a cache line, when refill data is obtained from a speculative cache line held by a cache memory of other processor, the speculation flag 23 has its flag corresponding to the other processor in question set. When the cache line is updated by speculative data in response to a speculative store instruction which is included in a thread executed by its own processor (hereinafter denoted as own thread), a flag of the speculation flag 23 corresponding to the own processor is set. When the cache line is updated by speculative data in response to a speculative store instruction included in a preceding thread (master thread) in the program order, a flag portion of the speculation flag 23 corresponding to a processor executing the master thread is set. On the other hand, the speculation flag 23 is reset when speculative execution of the own thread is settled and data of the cache line is settled.

The update flag 24 indicates that data of the cache line is updated by a thread located lower in the program order (slave thread). In other words, the flag represents that data of the cache line is valid for a thread currently executed by a processor in question, but it might not be valid for a thread subsequently allocated to the processor in question. The update flag 24 is composed of a one-bit update valid flag 24a and an update target flag 24b having as many bits as the number of processors excluding the own processor provided by the parallel processor. The update valid flag 24a indicates that the whole of the update flag 24 is valid. While all the update valid flags 24a are set when a thread ends, only the update valid flag 24a of the update flag 24 in which any of the update target flags 24b is set may be set as another embodiment. The update valid flag 24a being set and any of the update target flags 24b being set indicates that there is a possibility that the cache line in question is not valid for a thread to be executed next.

Whether the cache line in question is actually valid or not is determined by a cache line state exchanged between the cache control units at the time of input/output of the bus request following cache miss or the like and if the line is valid, the update valid flag 24a is reset together with the update target flag 24b. On the other hand, the update valid flag 24a being reset or all the update target flags 24b being reset represents that the cache line in question is valid also for a thread to be executed next. Each update target flag 24b, which corresponds to other processor, indicates that the cache line in question is updated by the corresponding processor.

The data entry 26 holds memory data of the cache line in question. In general, one cache line has a plurality of data entries forming an address range designated by the address tag 25, each of which data entry is a minimum data unit for writing by a store instruction etc. In FIG. 9, the plurality of data entries 26 are distinguished from each other by individual denotation, a data entry 26a, a data entry 26b, a data entry 26c, a data entry 26d, . . .

The store flag 27 indicates that the own processor conducts write to the corresponding data entry in response to a store instruction etc. In FIG. 9, a store flag 27a corresponds to the data entry 26a, a store flag 27b to the data entry 26b, a store flag 27c to the data entry 26c and a store flag 27d to the data entry 26d. The store flag is set when the own processor conducts writing and is reset when thread execution ends.

The speculative load flag 28 indicates that the own processor conducts speculative read from the corresponding data entry. In FIG. 9, a speculative load flag 28a corresponds to the data entry 26a, a speculative load flag 28b to the data entry 26b, a speculative load flag 28c to the data entry 26c and a speculative load flag 28d to the data entry 26d. The speculative load flag is set when speculative reading is conducted and data to be read is not written before, that is, when the corresponding store flag 27 is not set. On the other hand, when speculative execution of a thread is settled, the flag is reset.

Figure 10:
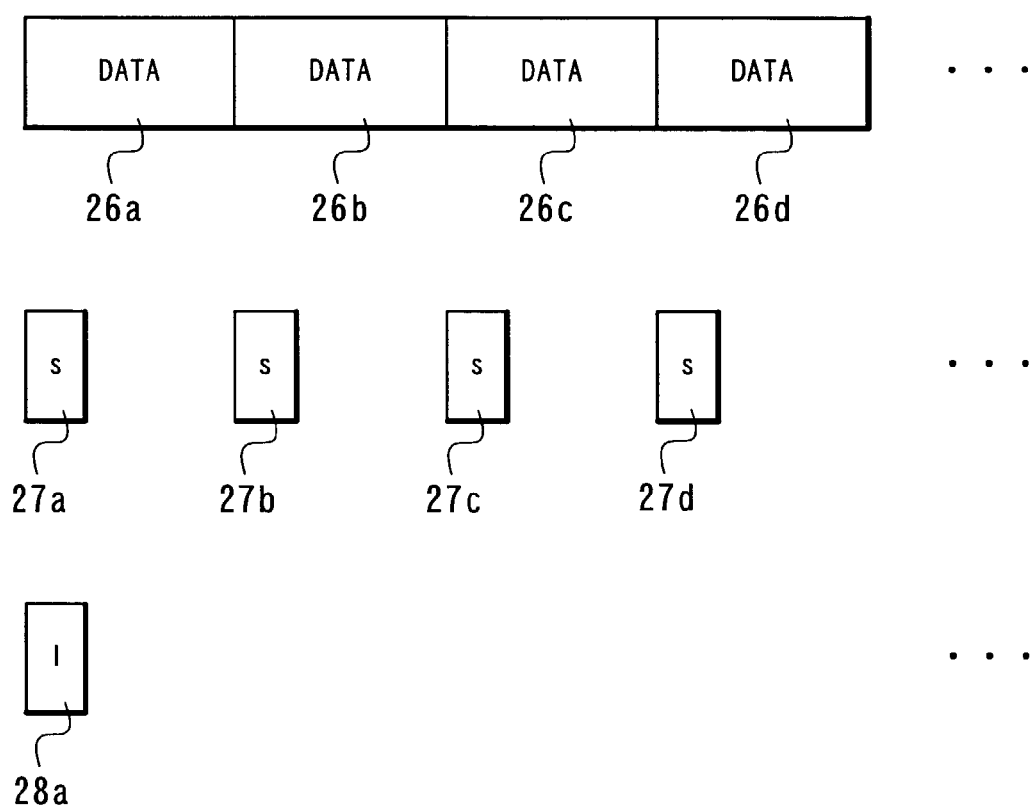
FIG. 10 is an explanatory diagram showing details of a second embodiment of a cache line forming the cache memory.

Although in the embodiment of the cache line shown in FIG. 9, for the data entries 26a, 26b, . . . as a minimum data unit for write, their inherent store flags 27a, 27b, . . . , and the speculative load flags 28a, 28b, . . . , are provided, respectively, a representative single store flag or speculative load flag may be provided for a plurality of data entries. For example, FIG. 10 shows a second embodiment of a cache line in which for the four data entries 26a, 26b, 26c and 26d, one speculative load flag 28a is provided. Components other than the data entry 26, the store flag 27 and the speculative load flag 28 are omitted from the illustration. The speculative load flag 28a indicates that speculative read is made from any of the four data entries 26a, 26b, 26c and 26d. In this case, the volume of hardware necessary for packaging a cache memory is smaller than that required in a case of a cache line in which each data entry has its inherent speculative load flag.

The version identifier (vid) 29 has as many bits as the number of processors that the parallel processor system has excluding the own processor, which bit corresponds to each of the processors other than the own processor. When writing is conducted in response to a store instruction etc., the version identifier 29 of the target line is set. Bits to be set are those correspond to processors executing all the master threads of relevant threads excluding a merged thread and the remaining bits are reset.

When a certain thread is terminated, in the version identifiers 29 of all the cache lines of cache memories of all the processors excluding a processor executing the thread in question, a bit corresponding to the processor executing the thread in question is reset.

More specifically, the version identifier 29 indicates a processor executing a master thread yet to be terminated at that time among all the master threads generating the own cache line.

In cache lines of different versions generated by two threads executed on a certain processor Pi, the version identifiers vid indicate the same version at the time point where all the threads between the two threads in the program order are terminated, which means that degeneration is conducted. When access is made to the own cache memory by other processor, the version identifier 29 will be referred to. When a bit of the version identifier 29 corresponding to the other processor in question is set, determination can be made that the access is made from a master thread of the own cache line. In this case, the data of the own cache line has a lower program order and is therefore not valid, so that the own cache memory will not respond to the access.

On the other hand, when a bit of the version identifier 29 corresponding to the other processor in question is reset, determination can be made that the access is made by a slave thread for the own cache line. In this case, the data of the cache line has a higher program order and is therefore valid, so that the own cache memory conducts appropriate response processing to the access. When reset of the version identifier 29 by the termination results in resetting all the bits of the version identifier 29, data of the own cache line will be at least settled.

In other words, data of a cache line in which all the bits of the version identifier 29 are reset can be written back to the main memory etc. The present embodiment generates no cache line of the same address and a different version and when a thread generated by free fork conducts writing, if a target line is a dirty line having an old version, delays execution of write until all-the old versions are settled and degenerated, thereby preventing generation of a plurality of versions.

Again referring to FIG. 8, the cache control unit 12 includes at least a bus request control unit 30, a cache request control unit 31, a bus request output buffer 32 and a bus request input buffer 33.

The bus request control unit 30 receives a cache miss notification and a store notification and their target address, store data, cache line state, etc. from the cache memory 11 and generates a bus request with reference to these received data to register the request in the bus request output buffer 32. Here, the cache line state includes the valid flag 20, the change flag 21, the shared flag 22, the speculation flag 23, the update flag 24, the store flag 27 and the version identifier 29 which form the cache line shown in FIG. 9. and at a cache miss, indicates a state of a cache line as a target of refilling processing in response to the cache miss and at a cache hit, indicates a state of the hit cache line.

The bus request output buffer 32 stores a bus request generated by the bus request control unit 30 and sequentially outputs the same to other processor and the main memory through the bus. In more detailed description, the bus request is composed of a command, an address, a cache line state, data and the like and the command, and the address are output to the request bus 13, the cache line state to the response bus 14 and the data to the data bus 15. The bus request output buffer 32 at the same time transfers the command and the address output to the request bus 13 and the cache line state output to the response bus 14 also to the bus request input buffer 33.

In the present embodiment, at the time of outputting the bus request, the bus request is output directed only to a processor sharing the data with reference to the shared flag 22 included in the cache line state. More specifically, on a processor failing to share the data, no access to a cache memory by the bus request will occur to have little performance degradation caused by contention for access to a cache memory and enable reduction of power consumed in the cache memory.

The bus request input buffer 33 stores a command and an address of a bus request transmitted through the request bus 13 from other processor or the main memory, a cache line state transmitted through the response bus 14 and data transmitted through the data bus 15. The bus request input buffer 33 also stores a command and an address of a bus request output from the bus request output buffer 32 to the request bus 13 and a cache line state output to the response bus 14 and further stores a cache line state output by other processor to the response bus 14 in response to the bus request upon its arrival. The bus request input buffer 33 at the same time sequentially outputs the stored bus request applied from the bus, that is, a command, an address, a cache line state and data, to the cache request control unit 31.

The cache request control unit 31 sequentially interprets bus requests which are held by the bus request input buffer 33 and which are sequentially applied therefrom. First, in response to a bus request from other processor which is applied from the bus, the unit 31 accesses the cache memory 11 to determine whether the processor holds a cache line as a target of the bus request and when the processor fails to hold the cache line, outputs data to that effect and when the processor holds the line, outputs a state of the cache line to the response bus 14 through the bus request control unit 30 and the bus request output buffer 32. At the same time, a cache line state of the own cache memory is stored in a relevant entry of the bus request input buffer 33. When all the responses of cache line states arrive at the bus request input buffer 33 from other processors including the own cache line state, the cache request control unit 31 again refers to all of the command of the bus request, the own cache line state and the cache line states of other processors to determine a subsequent state of the cache line and update the target cache line.

On the other hand, as to a bus request output by the own processor, since its command and address and a cache line state are stored in the bus request input buffer 33, when all of the cache line states from other processors arrive at the bus request input buffer 33, the cache request control unit 31 refers to all of the bus request command, the own cache line state and the cache line states of other processors to determine a subsequent state of the cache line and update the target cache line.

Figure 11:
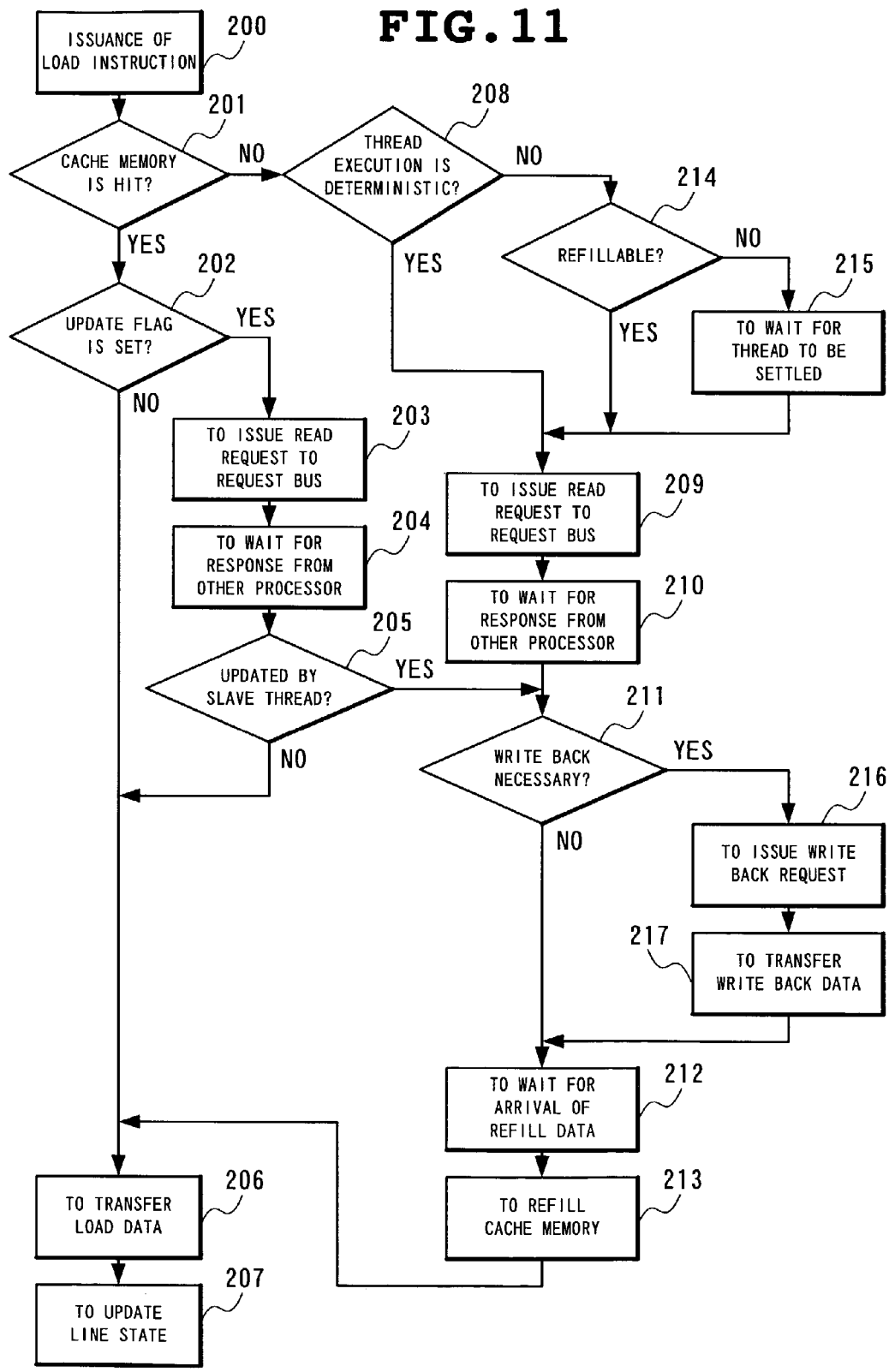
FIG. 11 is a flow chart showing operation of the cache memory and a cache control unit to be conducted when a load instruction is issued.

Next, with reference to the flow chart, operation of the cache memory 11 and the cache control unit 12 will be described in detail. FIG. 11 is a flow chart showing operation of the cache memory 11 and the cache control unit 12 conducted when a load instruction is issued. First, when the load instruction is issued by the processor 10 (Step 200 in FIG. 11), the cache memory 11 is accessed to determine whether the cache memory is hit or missed (Step 201 in FIG. 11). Here, hitting the cache memory is a phenomenon occurring when there exists a cache line whose valid flag 20 is set and whose address as a target of the load instruction in question falls within an address range indicated by the address tag 25. Existence of no cache line satisfying the above-described conditions is referred to as missing the cache memory.

When the cache memory is hit, the hit cache line is read to refer to the update flag 24 in the cache line (Step 202 in FIG. 11). When the update flag 24 is not set, that is, when the update valid flag 24a is not set or when none of the update target flags 24b is set, determination is made that the cache line is not updated by a slave thread and is therefore valid. In this case, data to be loaded is transferred from the cache memory 11 to the processor 10 (Step 206 in FIG. 11).

Next, when the load instruction in question is speculative execution in terms of a normal dependence relationship among threads, set the speculative load flag 28 corresponding to the data entry 26 which stores the data to be loaded (step 207 in FIG. 11) to end the execution of the load instruction. Whether the issued load instruction is speculative or deterministic is notified to the cache memory 11 by the processor 10.

On the other hand, when the reference to the update flag 24 finds that the update flag 24 is set (Step 202 in FIG. 11), that is, that the update valid flag 24a is set and any of the update target flags 24b is set, determination is made that the cache line is updated by a slave thread and there is a possibility that it is already invalid. The reason why deterministic determination of invalidity is impossible here is that update by a slave thread is speculative and it might be cancelled to leave a possibility that it is actually valid. For deterministic determination, a cache line state of a cache memory of a processor executing the slave thread should be referred to.

Therefore, the bus request control unit 30 generates a read request for referring to a cache memory of other processor and issues the read request to the request bus 13 through the bus request output buffer 32 (Step 203 in FIG. 11). At the same time, the read request, an address as a target of the read request and a state of the own cache line are stored in the bus request input buffer 33 to wait for a cache line state as a response to the read request to arrive from the cache control unit of other processor through the response bus 14 (Step 204 in FIG. 11).

When a response arrives from every processor in response to the read request, determination is made whether the own cache line is actually invalid or valid (Step 205 in FIG. 11). In more detailed description, refer to a cache line state of a processor corresponding to the set update target flag 24b and when the cache line is hit, determination is made that update is actually made by the processor. On the other hand, when in every processor corresponding to each of all the update target flags 24b set, the cache line is missed, determination is made that the update is cancelled due to a failure of speculative execution and the update is not actually made.

When the update is not actually made, the cache line in question is valid, so that reading processing can be immediately executed. In this case, the refilling processing is not necessary and a processor receiving the previously issued read request refrains from executing processing for the read request. In reading processing, data to be loaded is transferred from the cache memory 11 to the processor 10 (Step 206 in FIG. 11).

Next, update the cache line state to end the execution of the load instruction (Step 207 in FIG. 11). More specifically, first reset the update flag 24 and then when the load instruction is speculative execution, set the speculative load flag 28 corresponding to the data entry 26 in which the data to be loaded is stored.

On the other hand, when the update is actually made, the cache line in question is invalid, so that valid data should be refilled from the cache memory of other processor or the main memory. First, prior to the refilling processing, determination is made whether it is necessary to write back data of the cache line in question (Step 211 in FIG. 11). There is a case where the cache line in question is invalid for a thread being currently executed by the own processor and valid for a master thread.

In more detailed description, unless in the cache memory of the processor which updates the cache line in question, a settled cache line exists, that is, a cache line whose speculation flag 23 is not set exists, determination is made that the cache line in question holds the only one settled data to require write back. On the other hand, when a settled cache line exists among the cache lines of the processor which updates the cache line in question, determination is made that write back is unnecessary.

When the determination is made that write back is necessary, the bus request control unit 30 generates a write back request and outputs the same to the request bus 13 through the bus request output buffer 32 (Step 216 in FIG. 11) and then outputs data to be written back to the data bus 15 (Step 217 in FIG. 11). Next, wait for refill data transmitted from other cache memory or the main memory through the data bus 15 to arrive in response to the previously issued read request (Step 212 in FIG. 11). Next, the cache request control unit 31 conducts processing of refilling the cache memory 11 with the arriving refill data (Step 213 in FIG. 11), then transfers the data to be loaded from the cache memory 11 to the processor 10 (Step 206 in FIG. 11) and updates the cache line state to end the execution of the load instruction (Step 207 in FIG. 11).

On the other hand, when the determination is made at Step 211 of FIG. 11 that write back is unnecessary, wait for refill data to arrive without write back (Step 212 in FIG. 11) and refill the cache memory 11 (Step 213 in FIG. 11). Next, transfer data to be loaded from the cache memory 11 to the processor 10 (Step 206 in FIG. 11) and update the cache line state to end the execution of the load instruction (Step 207 in FIG. 11).

In the foregoing, operation to be conducted when the load instruction hits the cache memory at Step 201 of FIG. 11 has been described. On the other hand, operation to be conducted when the load instruction misses the cache memory varies depending on whether thread execution is deterministic or speculative (Step 208 in FIG. 11). In a case where the thread execution is speculative, that is, where the issued load instruction is speculative, determination is made whether the cache memory 11 is refillable or not (Step 214 in FIG. 11).

In a case where none of entries for refill destination candidates in the cache memory 11 is free and any of the speculation flags 23 and the store flags 27 of all the cache lines stored in these entries is set or any of the speculative load flags 28 is set, refilling is impossible. In this case, after waiting for a thread to be settled (Step 215 in FIG. 11), start refilling processing at Step 209 of FIG. 11.

On the other hand, when at least one of the entries for refill destination candidates in the cache memory 11 is free, refilling is possible. Even when there is no free entry, if any of the speculation flags 23 or the store flags 27 of any of the cache lines stored in these entries for refill destination candidates is not set and none of the speculative load flags 28 is set, refilling the entry is possible. In this case, the refilling processing is started at Step 209 in FIG. 11.

On the other hand, in a case where the thread execution is deterministic, that is, where the issued load instruction is deterministic (Yes at Step 208 in FIG. 11), refilling is always possible, so that the refilling processing is started at Step 209 in FIG. 11. More specifically, first, output a read request to the request bus 13 (step 209 in FIG. 11) to wait for a response thereto from other processor (Step 210 in FIG. 11).

Next, determination is made whether write back is necessary or not (Step 211 in FIG. 11). When in a refill destination entry, a cache line exists which is changed by a store instruction, that is, a cache line whose change flag 21 is set exists, write back is necessary. In this case, output a write back request to the request bus 13 (Step 216 in FIG. 11) and then output data to be written back to the data bus 15 (Step 217 in FIG. 11).

Next, wait for refill data to arrive (Step 212 in FIG. 11) and refill the cache memory 11 (Step 213 in FIG. 11). Next, transfer the data to be loaded from the cache memory 11 to the processor 10 (Step 206 in FIG. 11) and update the cache line state to end the execution of the load instruction (Step 207 in FIG. 11).

When write back is unnecessary, wait for the refill data to arrive without writing back (Step 212 in FIG. 11) and refill the cache memory 11 (Step 213 in FIG. 11). Next, transfer the data to be loaded from the cache memory 11 to the processor 10 (Step 206 in FIG. 11) and update the cache line state to end the execution of the load instruction (Step 207 in FIG. 11).

Operation of the cache memory 11 and the cache control unit 12 to be conducted when a load instruction is issued has been described in the foregoing. Next, with reference to FIG. 12, description will be made of operation of the cache memory 11 and the cache control unit 12 to be conducted when a store instruction is issued.

Figure 12:
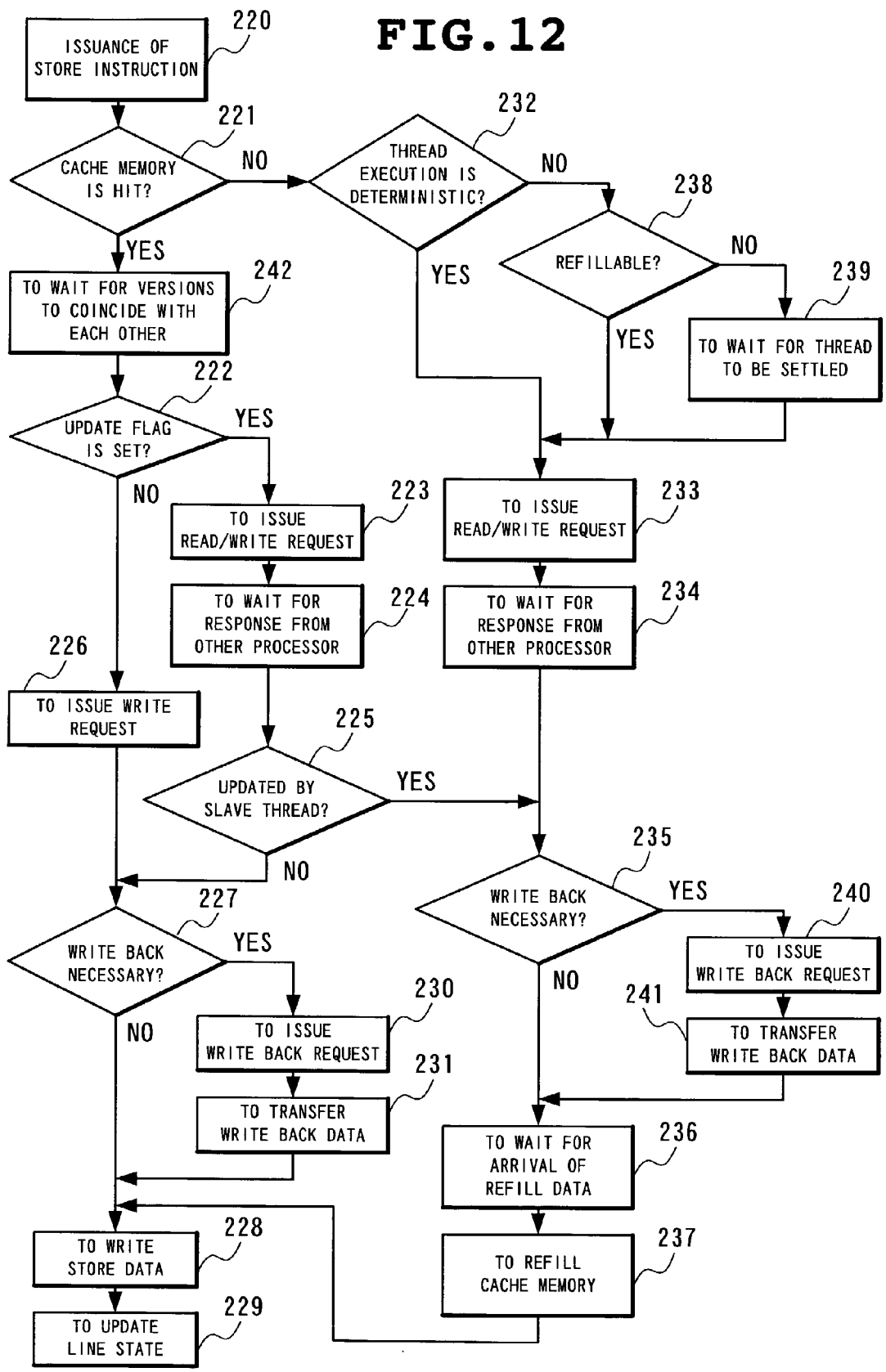
FIG. 12 is a flow chart showing operation of the cache memory and the cache control unit to be conducted when a store instruction is issued.

First, when a store instruction is issued by the processor 10 (Step 220 in FIG. 12), the cache memory 11 is accessed to determine whether the cache memory is hit or missed (Step 221 in FIG. 12). Here, hitting the cache memory is a phenomenon occurring when there exists a cache line whose valid flag 20 is set and whose address as a target of the store instruction in question falls within an address range indicated by the address tag 25. Existence of no cache line satisfying the above-described conditions is referred to as missing the cache memory.

When the cache memory is hit, the hit cache line is read to refer to the version identifier in the cache line (Step 242 in FIG. 12). Here, when the version of the hit cache line indicated by the version identifier fails to coincide with the version of a currently executed thread and it is a dirty (whose change flag 21 is set) cache line, wait for them to coincide with each other. The version stored in the version identifier is appropriately changed according to the end of the master thread to coincide with the version of the currently executed thread in due course. When the versions coincide with each other or when the cache line is not dirty, then the update flag 24 in the cache line is referred to at Step 222 in FIG. 12.

When the update flag 24 is not set, that is, when the update valid flag 24a is not set or when none of the update target flags 24b is set, determination is made that the cache line is not updated by a slave thread and is therefore valid. In this case, the bus request control unit 30 generates a write request and outputs the same to the request bus 13 through the bus request output buffer 32 (Step 226 in FIG. 12). The write request is a bus request for requesting notification of execution of a store instruction and its store data to other processor or the cache memory and processing responsive thereto.

Next, prior to write in response to the store instruction in question, determination is made whether write back of former data to the main memory is necessary or not (Step 227 in FIG. 12). In a case where the cache line hit by the store instruction in question is deterministic, that is, where the speculation flag 23 is not set and the store instruction in question is speculative execution, processing is conducted of writing back deterministic data to the main memory before speculative data is written. More specifically, output a write back request to the request bus 13 (Step 230 in FIG. 12) and subsequently transfer data to be written back through the data bus 15 (Step 231 in FIG. 12). Thereafter, write store data into the data entry 26 of a cache line as a target of write by the store instruction in question (Step 228 in FIG. 12). Next, update the cache line state to end the execution of the store instruction (Step 229 in FIG. 12).

More specifically, first, set the change flag 21 and the store flag 27 corresponding to the data entry in which data to be stored is stored. Then, when the store instruction in question is speculative execution, set a flag portion of the speculation flag 23 corresponding to the own processor. Furthermore, write the version of the currently executed thread to the version identifier 29.

On the other hand, when write back is unnecessary (No at Step 227 in FIG. 12), write store data into the data entry of the cache line as a target of write by the store instruction in question without writing back (Step 228 in FIG. 12). Next, update the cache line state to end the execution of the store instruction (Step 229 in FIG. 12).

On the other hand, when the reference to the update flag (Step 222 in FIG. 12) finds that the update flag 24 is set, that is, when the update valid flag 24a is set and any of the update target flags 24b is set, determination is made that the cache line is updated by a slave thread and accordingly has a possibility of being already invalid. In this case, the bus request control unit 30 generates a read•write request and issues the same to the request bus 13 (Step 223 in FIG. 12). The read•write request is a bus request for requesting that processing should be conducted with respect to an address to be simultaneously output to the request bus in response to the write request after processing for the read request is executed.

Next, wait for a response to the read•write request to arrive from other cache control unit (Step 224 in FIG. 12) and with reference to the response, determine whether the cache line in question is actually updated by a slave thread or not (Step 225 in FIG. 12). When the cache line in question is not actually updated, the cache line is valid, so that the write processing can be started immediately. In this case, the refilling processing is unnecessary and the processor receiving the previously issued read•write request refrains from conducting processing for the read request portion. In the writing processing, first, determine whether write back is necessary or not (Step 227 in FIG. 12). When write back is necessary, issue a write back request (Step 230 in FIG. 12) and transfer write back data (Step 231 in FIG. 12).

Next, write store data into the data entry of the cache line as a target of write by the store instruction in question (Step 228 in FIG. 12). Next, update the cache line state to end the execution of the store instruction (Step 229 in FIG. 12).

On the other hand, when in determining at Step 225 of FIG. 12 whether update is made by a slave thread or not, the update is actually made, the cache line in question is invalid, so that similarly to the case of the load instruction, refilling of valid data from a cache memory of other processor or the main memory is required. First, prior to the refilling processing, determination is made whether data of the cache line in question should be written back or not (Step 235 in FIG. 12).

There is a case where the cache line in question is invalid for a thread currently executed by the own processor and is valid for a master thread. In more detailed description, in a case where among cache lines of the processor updating the cache line in question, there exists no settled cache line, that is, no cache line whose speculation flag 23 is set, the cache line in question holds the only one data settled, so that determination is made that write back is required. On the other hand, when there exists a settled cache line among the cache lines of the processor which updates the cache line in question, determination is made that no write back is required.

When the determination is made that write back is required, issue a write back request (Step 240 in FIG. 12) and transfer write back data (Step 241 in FIG. 12). Next, wait for arrival of refill data transmitted from other cache memory or the main memory through the data bus 15 in response to the previously issued read•write request (Step 236 in FIG. 12). Next, the cache request control unit 31 conducts processing of refilling the cache memory 11 with the arriving refill data (Step 237 in FIG. 12).

Next, write store data into the data entry of the cache line as a target of write by the store instruction in question (Step 228 in FIG. 12). Next, update the cache line state to end the execution of the store instruction (Step 229 in FIG. 12).

On the other hand, when the determination is made that write back is unnecessary, wait for refill data to arrive without writing back (Step 236 in FIG. 12) and refill the cache memory 11 (Step 237 in FIG. 12). Next, write store data in response to the store instruction in question (Step 228 in FIG. 12) and update the cache line state to end the execution of the store instruction (Step 229 in FIG. 12).

In the foregoing, the operation conducted when a store instruction hits the cache memory at Step 221 in FIG. 12 has been described. On the other hand, when the store instruction misses the cache memory, operation to be conducted varies according to whether thread execution is deterministic or speculative (Step 232 in FIG. 12) similarly to the case of a load instruction. When the thread execution is speculative, that is, when the issued store instruction is speculative, determination is made whether the cache memory 11 is refillable or not (Step 238 in FIG. 12).

In a case where none of entries for refill destination candidates in the cache memory 11 is free and any of the speculation flags 23 and the store flags 27 of all the cache lines stored in these entries is set or any of the speculative load flags 28 is set, refilling is impossible. In this case, start the refilling processing after waiting for a thread to be settled (Step 239 in FIG. 12).

On the other hand, when at least one of the entries for refill destination candidates is free in the cache memory 11, refilling is possible. In addition, even if there is no free entry, when any of the speculation flag 23 or the store flag 27 of any of the cache lines stored in these entries for refill destination candidates is not set and none of the speculative load flags 28 is set, refilling the entry is possible. In this case, start the refilling processing without conducting any other processing.

On the other hand, when the thread execution is deterministic, that is, when the issued store instruction is deterministic (Yes at Step 232 in FIG. 12), refilling is always possible, so that the refilling processing is started without conducting any other processing. More specifically, first, output a read•write request to the request bus 13 (Step 233 in FIG. 12) to wait for a response thereto from other processor (Step 234 in FIG. 12).

Next, determination is made whether write back is necessary or not (Step 235 in FIG. 12). When an updated cache line exists in a refill destination entry, that is, when a cache line whose change flag 21 is set exists, determination is made that write back is necessary. When the determination is made that write back is necessary, continue the refilling processing after issuing a write back request (Step 240 in FIG. 12) and transferring write back data (Step 241 in FIG. 12). On the other hand, when the determination is made that write back is unnecessary, continue the refilling processing without write back. In the refilling processing, wait for refill data transmitted from other cache memory or the main memory through the data bus 15 to arrive in response to the previously issued read•write request (Step 236 in FIG. 12).

Next, the cache request control unit 31 refills the cache memory 11 with the arriving refill data (Step 237 in FIG. 12). Next, write store data into a data entry of the cache line as a target of write by the store instruction in question (Step 228 in FIG. 12). Then, update the cache line state to end the execution of the store instruction (Step 229 in FIG. 12).

In the foregoing, the operation of the cache memory 11 and the cache control unit 12 to be conducted when a store instruction is issued has been described. Next, with reference to FIG. 13, description will be made of operation of the cache memory 11 and the cache control unit 12 to be conducted when receiving a read request and that to be conducted with respect to a read request portion when receiving a read•write request from other processor through the bus. When receiving the read•write request, after executing processing for the read request, conduct processing for the write request which will be described later. In the following description, a read request or a read request portion of a read•write request will be simply denoted as a read request.

Figure 13:
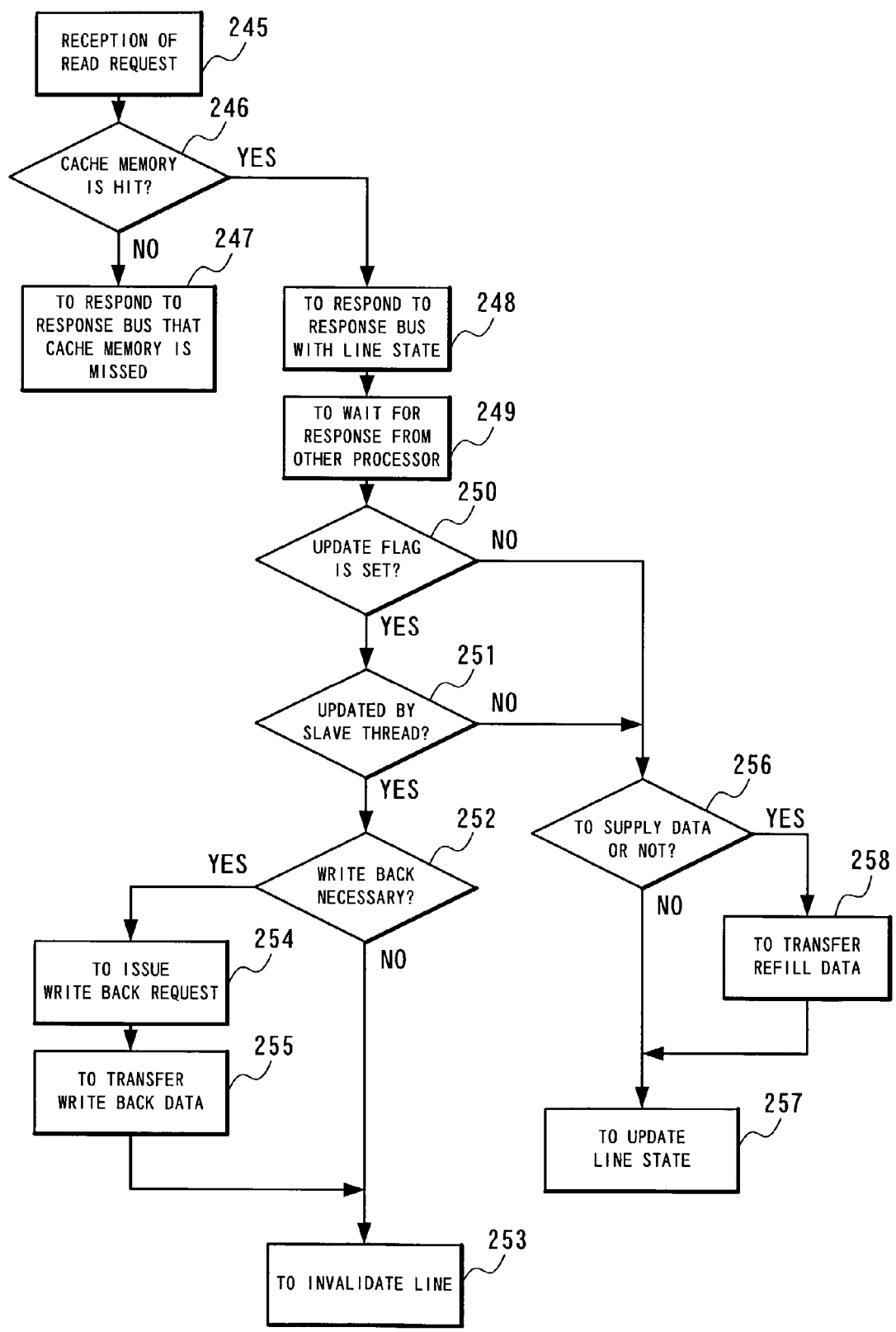
FIG. 13 is a flow chart showing operation of the cache memory and the cache control unit to be conducted when a read request is received.

First, upon receiving a read request from the cache control unit 12 of other processor through the request bus 13, the bus request input buffer 33 stores a command and an address of the read request in question and a cache line state of the processor which has issued the read request and notifies the cache request control unit 31 (Step 245 in FIG. 13).

Upon interpreting the read request, the cache request control unit 31 accesses the cache memory 11 to determine whether a target address of the read request hits the cache memory or miss the same (Step 246 in FIG. 13). Here, hitting the cache memory is a phenomenon occurring when there exists a cache line whose valid flag 20 is set and whose address as a target of the read request in question falls within an address range indicated by the address tag 25. Existence of no cache line satisfying the above-described conditions is referred to as missing the cache memory.

When the read request misses the cache memory 11, notify other processor to that effect through the bus request control unit 30, the bus request output buffer 32 and the response bus 14 to end the processing for the read request (Step 247 in FIG. 13).

On the other hand, when the read request hits the cache memory 11, notify other processor of the state of the hit cache line through the bus request control unit 30, the bus request output buffer 32 and the response bus 14 (Step 248 in FIG. 13) and wait for a cache line state of other cache memory as a response from other processor to arrive (Step 249 in FIG. 13).

Next, with reference to the update flag 24 of the own hit cache line state, determine whether the update flag 24 is set or not (Step 250 in FIG. 13).

When the update flag 24 is not set, that is, when the update valid flag 24a is not set or none of the update target flags 24b is set, determination is made that the cache line is not updated by a slave thread and is therefore valid. In this case, determine whether data of the own cache line should be supplied as refill data or not (Step 256 in FIG. 13).

On the other hand, when the update flag 24 is set, that is, when the update valid flag 24a is set and any of the update target flags 24b is set, determination is made that the cache line is updated by the slave thread to have a possibility of being already invalid. In this case, with reference to a response of a cache line state from other processor, determination is made whether the own cache line is actually invalid or valid (Step 251 in FIG. 13).

In more detailed description, with reference to the cache line state of a processor corresponding to the set update target flag 24b, when the cache line is hit, determination is made that update is actually made by the processor. On the other hand, when in every processor corresponding to each of all the update target flags 24b set, the cache line is missed, determination is made that the update is cancelled by a failure of speculative execution and no update is actually made.

When no update is actually made by a slave thread, determination is made whether to supply data of the own cache line as refill data (Step 256 in FIG. 13). In the determination, first determine whether the processor which has issued the read request actually needs the refilling processing or not. This is because there is a case where although the read request is issued (203 in FIG. 11 or 223 in FIG. 12), the cache line is actually valid to require no refilling processing (No at 205 in FIG. 11 or No. at 225 in FIG. 12). Since a processor having received the read request is also allowed to refer to a cache line state of every cache memory, it is allowed to make the same determination as that made by the processor having issued the read request.

In a case where the processor having issued the read request actually requires no refilling processing, no refill data will be supplied. On the other hand, in a case where the processor having issued the read request actually requires the refilling processing, next refer to a cache line state of a processor executing a thread located in the program order between a thread generating the data of the own cache line hit and a thread being executed by the processor having issued the read request. A processor executing a thread located between these threads can be specified by referring to a version identifier of the own cache line and a version identifier of a cache line hit in other cache memory which is notified by other processor. This is because reference to a bit set in a version identifier enables a processor executing a master thread of the thread which has generated the data of the cache line in question to be specified.

Whether to supply refill data or not is determined according to a cache line state of a thread between them and the own cache line state. The thread order relationship will be notified to each cache control unit 12 by the own processor 10.

First, when among the cache lines of a thread between these threads, a speculative cache line (speculation flag 23 is set) exists, the data of the own cache line is invalid as refill data, so that the own processor will supply no refill data.

Next, in a case where among the cache lines of a thread between them, no speculative cache line exists, but a deterministic cache line exists and the own cache line is deterministic, the own processor will supply no refill data.

Next, in a case where among the cache lines of a thread between them, no speculative cache line exists, but a deterministic cache line exists and the own cache line is speculative, the own processor will supply refill data from the own cache line.

Next, when in a processor executing a thread between them, every cache memory is missed and no valid cache line exists, the own processor supplies refill data from the own cache line.

When supplying no refill data, update the cache line state. More specifically, reset the update flag 24 to end the processing in response to the read request (Step 257 in FIG. 13). On the other hand, when supplying refill data, transfer the data held by the own cache line through the data bus 15 (Step 258 in FIG. 13) and then update the cache line state to end the processing in response to the read request (Step 257 in FIG. 13).

On the other hand, in a case where in the determination whether update is made by a slave thread or not (Step 251 in FIG. 13), the update is actually made, the cache line in question is already invalid, so that the cache line is invalidated. First, prior to invalidation processing, determination is made whether data of the cache line should be written back or not (Step 252 in FIG. 13).

There is a case where the cache line in question is invalid for the thread being currently executed by the own processor and valid for the master thread. In more detailed description, when a settled cache line, that is, a cache line whose speculation flag 23 is not set, fails to exist among the cache lines of the processor which has updated the cache line in question, the cache line in question holds the only one settled data, so that determination is made that write back is necessary. On the other hand, a settled cache line exists among the cache lines of the processor which has updated cache line in question, determination is made that write back is unnecessary.

When the determination is made that write back is necessary, output a write back request to the request bus 13 (Step 254 in FIG. 13) and then output data to be written back to the data bus 15 (Step 255 in FIG. 13). Thereafter, reset the valid flag 20 of the cache line to invalidate the cache line and end the processing for the read request (Step 253 in FIG. 13).

On the other hand, when the determination is made that write back is unnecessary, reset the valid flag 20 of the cache line without write back to invalidate the cache line and end the processing for the read request (Step 253 in FIG. 13).

In the foregoing, the description has been made of the operation of the cache memory 11 and the cache control unit 12 to be conducted when receiving a read request from other processor through a bus and that to be conducted with respect to a read request portion when receiving a read•write request.

Next, with reference to FIG. 14, description will be made of operation of the cache memory 11 and the cache control unit 12 to be conducted when receiving a write request from other processor through a bus and that to be conducted with respect to a write request portion when receiving a read•write request. When receiving the read•write request, after executing the above-described processing for the read request, conduct processing for the write request. In the following description, the write request and a write request part of the read•write request will be simply denoted as a write request.

Figure 14:
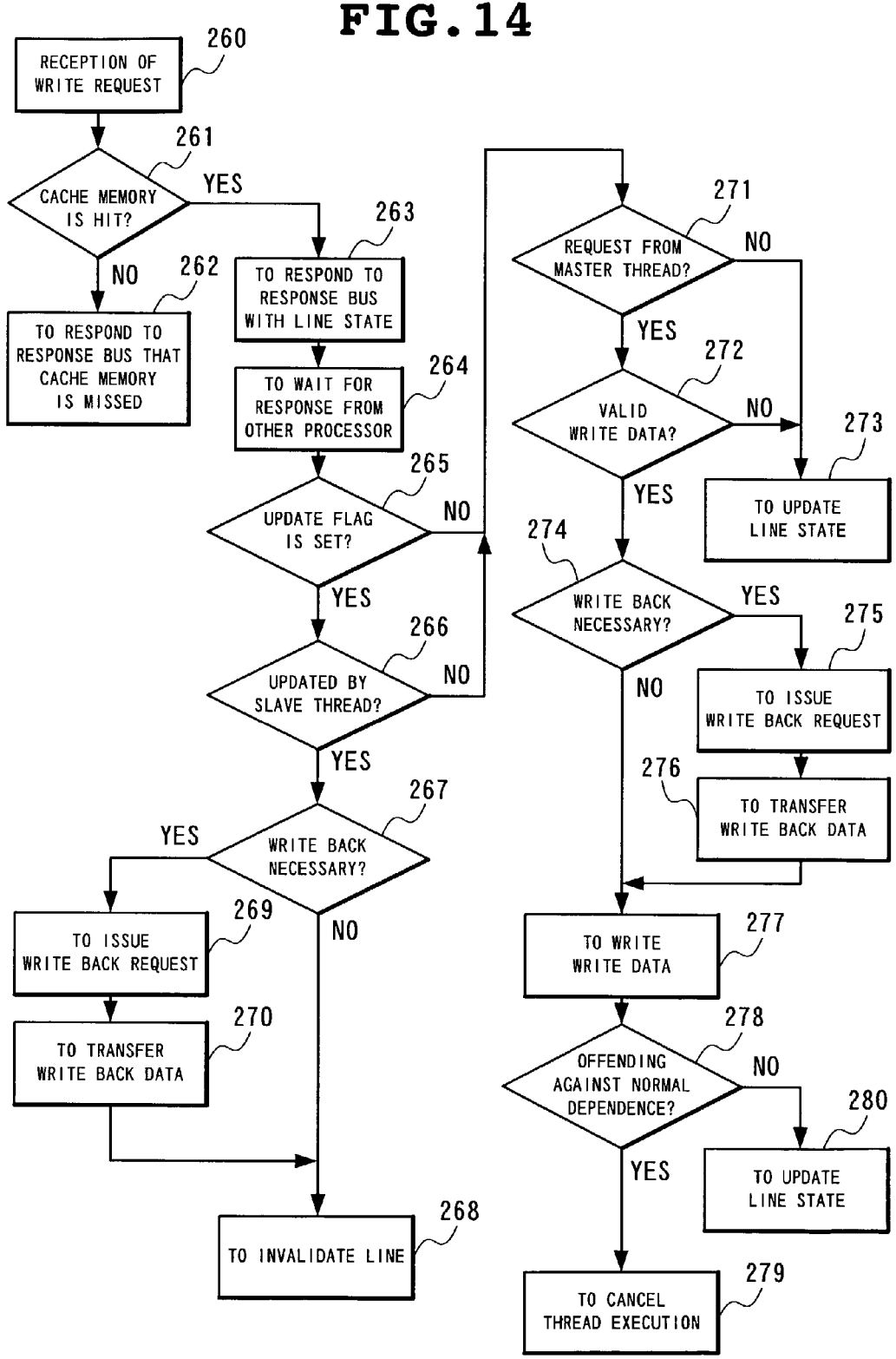
FIG. 14 is a flow chart showing operation of the cache memory and the cache control unit to be conducted when a write request is received.
Figure 15:
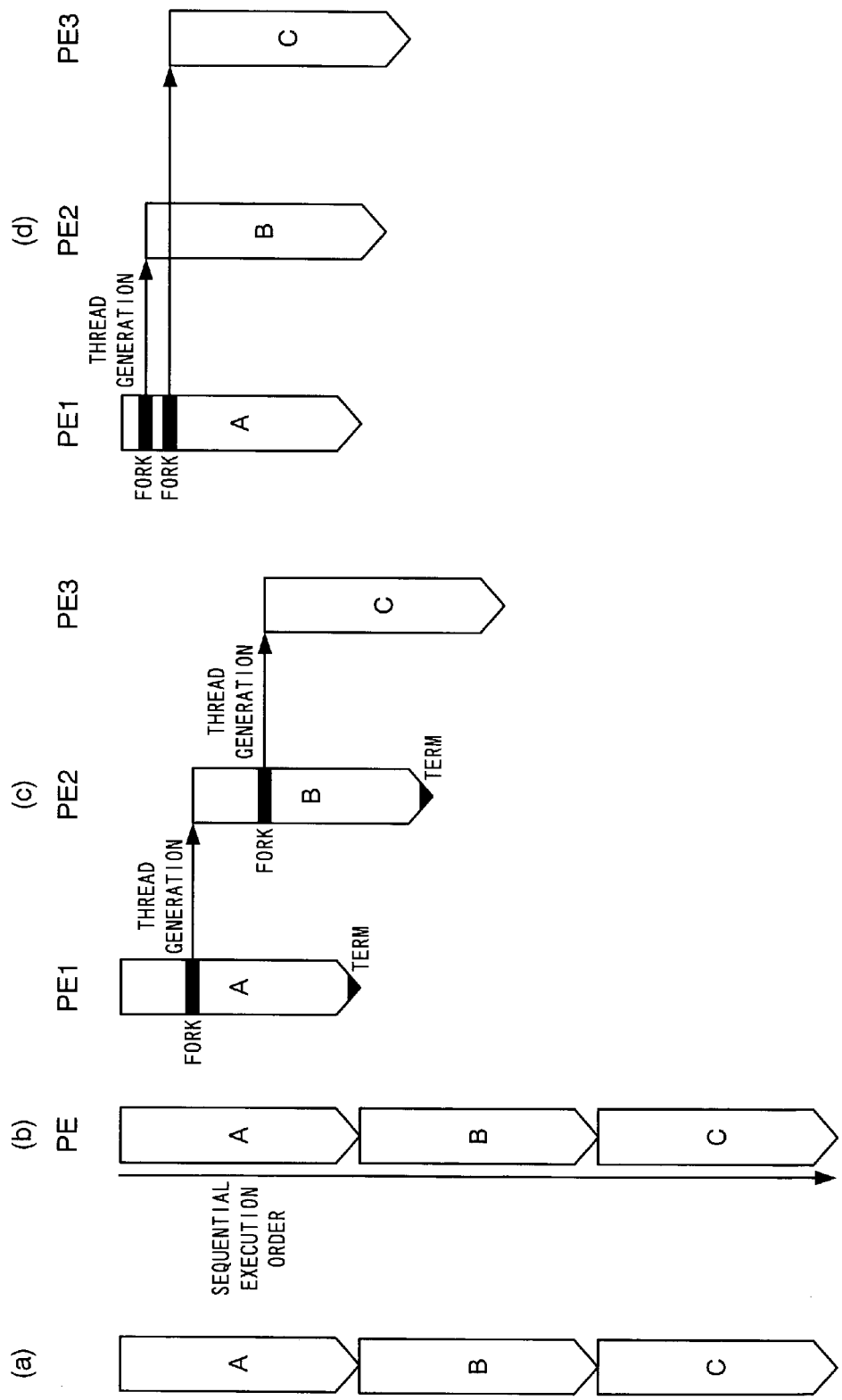
FIG. 15 is a diagram showing outlines of processing of a conventional multi-thread execution method.
Figure 16:
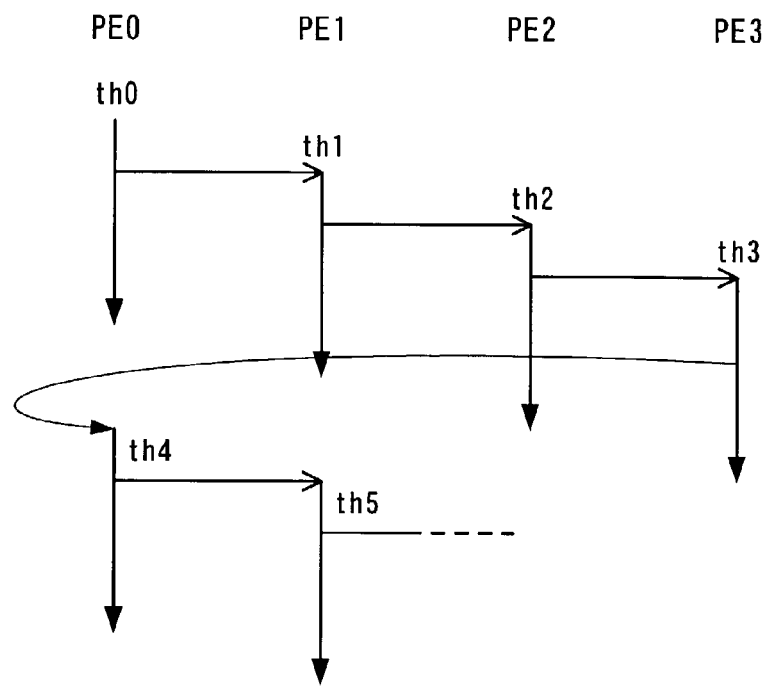
FIG. 16 is an explanatory diagram for use in explaining a conventional problem.
Figure 17:
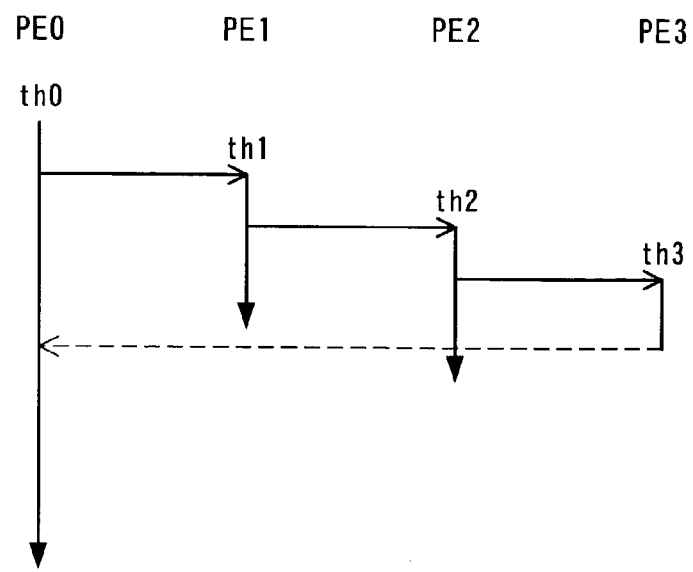
FIG. 17 is an explanatory diagram for use in explaining a conventional problem.

First, upon receiving a write request from the cache control unit 12 from other processor through the request bus 13, the bus request input buffer 33 stores a command and an address of the write request in question, a cache line state of the processor which has issued the write request, and write data and notifies the cache request control unit 31 of the same (Step 260 in FIG. 14).

Upon interpreting the write request, the cache request control unit 31 accesses the cache memory 11 to determine whether a target address of the write request hits the cache memory or misses the same (Step 261 in FIG. 14). Here, hitting the cache memory is a phenomenon occurring when there exists a cache line whose valid flag 20 is set and whose address as a target of the write request in question falls within an address range indicated by the address tag 25. Existence of no cache line satisfying the above-described conditions is referred to as missing the cache memory.

When the write request misses the cache memory 11, notify other processor to that effect through the bus request control unit 30, the bus request output buffer 32 and the response bus 14 to end the processing for the write request (Step 262 in FIG. 14).

On the other hand, when the write request hits the cache memory 11, notify other processor of the state of the hit cache line through the bus request control unit 30, the bus request output buffer 32 and the response bus 14 (Step 263 in FIG. 14) to wait for a cache line state of other cache memory as a response from other processor to arrive (Step 264 in FIG. 14).

Next, with reference to the update flag 24 of the own hit cache line state, determination is made whether the update flag 24 is set or not (Step 265 in FIG. 14).

In a case where the update flag 24 is not set, that is, where the update valid flag 24a is not set or none of the update target flags 24b is set, determination is made that the cache line is not updated by the slave thread and the cache line is valid. In this case, start processing of writing to the own cache line (No at Step 265 in FIG. 14).

On the other hand, when the update flag 24 is set, that is, when the update valid flag 24a is set and any of the update target flags 24b is set, determination is made that the cache line is updated by the slave thread to-have a possibility of-being already invalid. In this case, with reference to a response of the cache line state from other processor, determine whether the own cache line is actually invalid or valid (Step 266 in FIG. 14). In more detailed description, refer to a cache line state of a processor corresponding to the set update target flag 24b and when the cache line is hit, determine that update is actually made by the processor. On the other hand, when in every processor corresponding to each of all the update target flags 24b set, the cache line is missed, determination is made that the updating is cancelled by a failure of speculation execution and no update is made actually.

When no update is actually made by the slave thread, start the processing of writing to the own cache line (No at Step 266 in FIG. 14). In the writing processing, determine whether it is a write request from a master thread of a thread generating the data of the own hit cache line (Step 271 in FIG. 14). The determination can be realized by specifying a processor executing the master thread of the thread generating the data of the cache line in question with reference to a set bit in the version identifier of the own cache line.

When it is a write request from the slave thread, which means writing located lower in the program order, no data update will be actually made to set the update target flag 24b corresponding to the processor having issued the write-request in the update flag 24 of the cache line indicative of being updated by the slave thread and end the processing for the write request (Step 273 in FIG. 14).

On the other hand, when it is a write request from the master thread, next determine whether there exists a valid write data portion or not (Step 272 in FIG. 14). In the determination, first refer to a cache line state of a processor executing a thread located in the program order between a thread executed by the processor which has issued the write request and a thread generating the data of the own cache line hit. The processor executing a thread located between them can be specified with reference to the version identifier of the own cache line and a version identifier of a hit cache line of other cache memory notified by other processor. This is because reference to a set bit in the version identifier enables a processor executing a master thread of the thread generating the data of the cache line in question to be specified. Whether there exists a valid write data portion or not is determined by a cache line state of a thread between them and the own cache line state.

More specifically, in a case where with respect to the write data, a write data portion in which the store flag 27 is set exists in a cache line of a thread between them, the write data portion is invalid for the own thread. Conversely, in any of cache lines of threads between them, there exists a write data portion in which the store flag 27 is not set, the write data portion is valid for the own thread.

When there exists no valid write data portion, update the cache line state to end the processing for the write request (Step 273 in FIG. 14). On the other hand, when a valid write data portion exists, conduct writing processing of the write data portion. First, prior to actual execution of writing, determine whether write back of the former data to the main memory is necessary or not (Step 274 in FIG. 14).

In a case where the cache line hit by the write request in question is deterministic, that is, where the speculation flag 23 is not set and the write request in question is a speculative request, write deterministic data back to the main memory before writing speculative data. More specifically, output a write back request to the request bus 13 (Step 275 in FIG. 14) and subsequently transfer data to be written back through the data bus 15 (Step 276 in FIG. 14).

Thereafter, start actual writing processing. On the other hand, when write back is unnecessary (No at Step 274 in FIG. 14), start the actual writing processing without write back. Whether the write request is speculative or deterministic is given by the processor which has issued the write request simultaneously with the request according to whether a store instruction as a cause of the write request is speculative or deterministic.

In the actual write processing (Step 277 in FIG. 14), write the above-described valid write data portion into the data entry 26 corresponding to the own cache line. In the writing, no writing is made to the data entry which is first written by the own processor in which the store flag 27 is set.

Next, detect a normal dependence relationship of the store instruction of the received write request on a load instruction speculative with respect to the normal dependence relationship previously executed by own processor (Step 278 in FIG. 14). When any of the speculative load flags 28 of the data entries corresponding to the above-described valid write data portion is set, determination is made that normal dependence relationship exists and the execution of the speculative load instruction fails. In this case, the cache memory 11 notifies the processor 10 of the failure of the speculative execution and the processor 10 cancels thread execution (Step 280 in FIG. 14).

On the other hand, when none of the speculative load flags 28 of the data entries corresponding to the above-described valid write data portion is set, determination is made that no normal dependence relationship exists and the speculative execution of the load instruction succeeds. In this case, update the cache line state to end the processing for the write request (Step 279 in FIG. 14).

On the other hand, in a case where in the determination whether update is made by the slave thread or not (Step 266 in FIG. 14), when the update is actually made, the cache line in question is already invalid, so that the cache line is invalidated. First, prior to invalidation processing, determine whether writing back of the data of the cache line in question is necessary or not (Step 267 in FIG. 14).

There is a case where the cache line in question is invalid for a thread being currently executed by the own processor and is valid for a master thread. In more detailed description, when a settled cache line, that is, a cache line whose speculation flag 23 is not set, fails to exist among cache lines of a processor updating the cache line in question, since the cache line in question holds the only one settled data, determination is made that write back is necessary. On the other hand, when a settled cache line exists among the cache lines of the processor which updates the cache line in question, determination is made that no write back is necessary.

When the determination is made that write back is necessary, output a write back request to the request bus 13 (Step 269 in FIG. 14) and then output data to be written back to the data bus 15 (Step 270 in FIG. 14). Thereafter, reset the valid flag 20 of the cache line to invalidate the cache line and end the processing for the write request (Step 268 in FIG. 14).

On the other hand, when the determination is made that no write back is necessary, reset the valid flag 20 of the cache line without write back and invalidate the cache line to end the processing for the write request (Step 268 in FIG. 14).

The foregoing is the description of the operation of the cache memory 11 and the cache control unit 12 to be conducted when receiving a write request from other processor through a bus and that to be conducted with respect to a write request portion when receiving a read•write request. As described above, one of the features of the present embodiment is combining bus requests for the same address and issuing them simultaneously. Another feature is implicitly executing processing of a cache line which might be updated to be invalid in response to the bus request. This enables reduction in the number of bus requests to be issued to reduce performance degradation due to contention for a bus and reduce power consumed by a bus. Although in the above description, a read request and a write request for the same address are unified to be a read•write request, write back requests for the same address may be unified.

When thread execution is cancelled in such a case where speculative execution of a load instruction fails, by first resetting all the speculative load flags 27 in all the cache lines forming the cache memory 11, abandon records of the speculatively executed load instruction. Next, by invalidating a speculative cache line among the cache lines forming the cache memory 11, abandon data invalid because of a failure of speculative execution.

More specifically, when among speculative cache lines, thread execution is cancelled also in a processor which causes the cache line in question speculative, reset the valid flag 20 of the cache line in question to invalidate the cache line. According to the present embodiment, the speculation flag 23 indicating that a cache line is speculative is formed of a plurality of bits, which enables a processor causing the cache line in question to be speculative to be specified. Therefore, according to a conventional method in which a speculation flag is formed of one bit, a cache line which strictly speaking needs not to be invalidated will be invalidated, while according to the present embodiment in which only a cache line whose invalidation is strictly speaking necessary will be invalidated to lower a probability of occurrence of a cache miss and enable high-speed thread parallel processing.

On the other hand, when speculative thread execution is settled, by settling a speculative cache line among the cache lines forming the cache memory 11, data settled by the success of speculative execution is validated. This processing can be realized by resetting the speculation flag 23, the store flag 27 and the speculative load flag 28. Among the threads executed by the respective processors, at least a thread located at the highest in the program order has its execution settled. Execution of the remaining threads is settled in one case and speculative in another and in any case, execution is settled when the own thread becomes the most preceding thread among those executed after execution of all the preceding threads is completed.

Although the present invention has been described in the foregoing with respect to the embodiments, it is not limited to the foregoing embodiments and allows other kinds of addition and modification. For example, in the above-described embodiment, the present invention is applied to a centralized thread management type parallel processor system in which a thread management unit is provided commonly for a plurality of thread execution units, it is also applicable to a distributed thread management type parallel processor system in which a thread management unit is provided for each thread execution unit.

As described in the foregoing, the present invention enables effective use of processor resources by merging a thread being terminated and yet to be settled into its immediately succeeding slave thread, thereby enhancing the degree of thread parallelization.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A multi-thread execution method in a parallel processor system, said parallel processor system including a plurality of thread execution units and a main memory, each thread execution unit of said plurality of thread execution units having a processor for executing threads, said parallel processor system allowing for execution of a plurality of threads of a program in parallel to each other by using the plurality of thread execution units, said multi-thread execution method comprising:

executing, by a first thread execution unit of said plurality of thread execution units, a first thread of said plurality of threads, said first thread including a fork instruction to fork a second thread of said plurality of threads;

forking by said first thread execution unit, said second thread to a second thread execution unit of said plurality of thread execution units when said first thread execution unit executes said fork instruction; and merging said first thread of the first thread execution unit, which thread is terminated and yet to be settled, into said second thread of said second thread execution unit to allow for forking of a new thread of said plurality of threads to said first thread execution unit.

2. The multi-thread execution method as set forth in claim 1, wherein a temporary buffer is provided for each individual thread execution unit to, at the merging of a thread that the thread execution unit at a term state has into an immediately succeeding slave thread, transfer a temporary execution result preserved in the temporary buffer of the thread execution unit at the term state to the temporary buffer of the thread execution unit which executes said slave thread.

3. The multi-thread execution method as set forth in claim 1, wherein a cache memory serving also as a temporary buffer is provided for each individual thread execution unit to hold, for each cache line of said cache memory, version information which distinguishes data generated by a thread being terminated and yet to be settled and data generated by a thread newly generated after said merging, said cache memory of each thread execution unit making a selective response taking said version information and a thread sequential execution order into consideration in response to access from another thread execution unit.

4. The multi-thread execution method as set forth in claim 3, wherein
at the time of writing by a thread executed by each thread execution unit to the own cache memory, when the version information of the cache line as a target of write is older than the version of the own thread, queuing is conducted until the version of the cache line in question is appropriately changed according to termination of a master thread to coincide with the version of the own thread.

5. A multi-thread execution method in a parallel processor system, said parallel processor system including a plurality of thread execution units, each thread execution unit of said plurality of thread execution units having a processor for executing threads, said parallel processor system allowing for execution of a plurality of threads of a program in parallel to each other by using the plurality of thread execution units, said multi-thread execution method comprising;
managing each respective thread execution unit of the plurality of thread execution units as being in one of three states, said three states including (i) a free state where a fork to said thread execution unit is possible, (ii) a busy state where a thread of said plurality of threads is being executed by said thread execution unit, and (iii) a term state where a particular thread of said plurality of threads that is terminated and yet to be settled exists; and
merging, at a time of forking of a new thread of said plurality of threads when there exists no thread execution unit of said plurality of thread execution units at the free state, a specific thread of a specific thread execution unit at the term state into an immediately succeeding slave thread of the specific thread, said slave thread being executed on another thread execution unit of said plurality of thread execution units, whereby the specific thread execution unit is brought to the free state for permitting forking of the new thread to the specific thread execution unit.

6. The multi-thread execution method as set forth in claim 5, wherein
a temporary buffer is provided for each individual thread execution unit to, at the merging of the specific thread that the specific thread execution unit at the term state has into said immediately succeeding slave thread, transfer a temporary execution result preserved in the temporary buffer of the specific thread execution unit at the term state to the temporary buffer of a thread execution unit which executes said slave thread.

7. The multi-thread execution method as set forth in claim 5, wherein
a cache memory serving also as a temporary buffer is provided for each individual thread execution unit to hold, for each cache line of said cache memory, version information which distinguishes data generated by a thread being terminated and yet to be settled and data generated by a thread newly generated after said merging, said cache memory of each thread execution unit making a selective response taking said version information and a thread sequential execution order into consideration in response to access from another thread execution unit.

8. The multi-thread execution method as set forth in claim 7, wherein
at the time of writing by a thread executed by each thread execution unit to the own cache memory, when the version information of the cache line as a target of write is older than the version of the own thread, queuing is conducted until the version of the cache line in question is appropriately changed according to termination of a master thread to coincide with the version of the own thread.

9. A parallel processor system for executing a plurality of threads of a program in parallel to each other by a plurality of thread execution units, said parallel processor system comprising:
the plurality of thread execution units, each thread execution unit of said plurality of thread execution units having a processor for executing threads, a first thread execution unit of said plurality of thread execution units being configured to execute a first thread of said plurality of threads, said first thread including a fork instruction to fork a second thread of said plurality of threads, said first thread execution unit being configured to fork said second thread to a second thread execution unit of said plurality of thread execution units when said first thread execution unit executes said fork instruction;
a communication path for connecting the plurality of thread execution units with each other; and
means for merging said first thread of the first thread execution unit, when the first thread is terminated and yet to be settled, into said second thread of said second thread execution unit, so as to allow for forking of a new thread of said plurality of treads to said first thread execution unit.

10. The parallel processor system as set forth in claim 9, comprising
a temporary buffer provided for each individual thread execution unit for, at the merging of a thread that a thread execution unit at a term state has into an immediately succeeding slave thread, transferring a temporary execution result preserved in the temporary buffer of the thread execution unit at the term state to the temporary buffer of the thread execution unit which executes said slave thread.

11. The parallel processor system as set forth in claim 9, comprising
a cache memory serving also as a temporary buffer provided for each individual thread execution unit for holding, for each cache line of said cache memory, version information which distinguishes data generated by a thread being terminated and yet to be settled and data generated by a thread newly generated after said merging, said cache memory of each thread execution unit making a selective response taking said version information and a thread sequential execution order into consideration in response to access from another thread execution unit.

12. The parallel processor system as set forth in claim 11, wherein
the cache memory of each thread execution unit, at the time of writing by a thread executed by the own thread execution unit, when the version information of the cache line as a target of write is older than the version of said thread, waits for the version of the cache line in question to be appropriately changed according to termination of a master thread and to coincide with the version of said thread.

13. A parallel processor system for executing a plurality of threads of a program in parallel to each other by a plurality of thread execution units, comprising:

the plurality of thread execution units, each thread execution unit of said plurality of thread execution units having a processor for executing threads;

a communication path for connecting the plurality of thread execution units with each other;

means for managing each respective thread execution unit of said plurality of thread execution units as being in one of three states, said three states including (i) a free state where a fork to said thread execution unit is possible, (ii) a busy state where a thread of said plurality of threads is being executed, and (iii) a term state where a particular thread of said plurality of threads that is terminated and yet to be settled exists; and means for, at a time of forking of a new thread of said plurality of threads when there exists no thread execution unit of said plurality of thread execution units at the free state, merging a specific thread of a specific thread execution unit at the term state into an immediately succeeding slave thread of the specific thread to bring the specific thread execution unit to the free state and to conduct forking of the new thread to the specific thread execution unit, said slave thread being executed on another thread execution unit of said plurality of thread execution units.

14. The parallel processor system as set forth in claim 13, comprising a temporary buffer provided for each individual thread execution unit for, at the merging of a thread that a thread execution unit at the term state has into an immediately succeeding slave thread, transferring a temporary execution result preserved in the temporary buffer of the thread execution unit at the term state to the temporary buffer of the thread execution unit which executes said slave thread.

15. The parallel processor system as set forth in claim 13, comprising a cache memory serving also as a temporary buffer which is provided for each individual thread execution unit for holding, for each cache line of said cache memory, version information which distinguishes data generated by a thread being terminated and yet to be settled and data generated by a thread newly generated after said merging, said cache memory of each thread execution unit making a selective response taking said version information and a thread sequential execution order into consideration in response to access from another thread execution unit.

16. The parallel processor system as set forth in claim 15, wherein the cache memory of each thread execution unit, at the time of writing by a thread executed by the own thread execution unit, when the version information of the cache line as a target of write is older than the version of said thread, waits for the version of the cache line in question to be appropriately changed according to termination of a master thread and coincide with the version of said thread.

* * * * *